(12) United States Patent
Azòcar

(10) Patent No.: US 7,267,409 B2
(45) Date of Patent: Sep. 11, 2007

(54) HIGH TONNAGE ULTRA LIGHT MINING TRUCK WITH A GREATER LOAD EFFICIENCY FOR OFF-ROAD APPLICATIONS THAT COMPRISES A LIGHTWEIGHT POWER AND TRACTION SYSTEM, A STEERING SYSTEM AND A LATERAL SUSPENSION AND TIPPING SYSTEM FOR THE LIGHTWEIGHT CURVED DUMP

(75) Inventor: Alberto Cristiàn Feuereisen Azòcar, Santiago (CL)

(73) Assignees: Belemark S.A, Montevideo (UY); Diesel Machinery Int'l Corp., Miami, FL (US)

( * ) Notice: Subject to any disclaimer, the term of this patent is extended or adjusted under 35 U.S.C. 154(b) by 46 days.

(21) Appl. No.: 11/004,621

(22) Filed: Dec. 3, 2004

(65) Prior Publication Data

US 2006/0202545 A1    Sep. 14, 2006

(30) Foreign Application Priority Data

Jul. 23, 2004    (CL) .................................. 1868-2004

(51) Int. Cl.
*B60B 1/16*    (2006.01)
(52) U.S. Cl. ..................... 298/18; 298/17 R; 298/22 P; 280/124.11; 180/411
(58) Field of Classification Search ................. 298/13, 298/17 R, 18, 22 R, 22 P, 17.7; 280/86, 280/100, 492, 676, 124.11, 124.116; 180/24.06, 180/411, 24.07
See application file for complete search history.

(56) References Cited

U.S. PATENT DOCUMENTS

| | | | |
|---|---|---|---|
| 2,490,532 A | 12/1949 | Maxon, Jr. | |
| 3,139,286 A | 6/1964 | Johnson | |
| 3,413,032 A | 11/1968 | Dendy | |
| 3,814,479 A | 6/1974 | Vomberger | |
| 4,531,781 A | 7/1985 | Hunt et al. | |
| 4,619,484 A * | 10/1986 | Maxey ........................ | 298/18 |
| 4,678,235 A | 7/1987 | Hagenbuch | |
| 6,022,068 A | 2/2000 | D'Amico | |
| 6,520,590 B2 | 2/2003 | Feuereisen Azocar | |
| 6,554,367 B2 | 4/2003 | Jensen | |
| 6,905,175 B1 | 6/2005 | Verros | |

OTHER PUBLICATIONS

International Search Report and Written Opinion of the International Searching Authority for PCT Appln. Serial No. PCT/US05/21303 dated Nov. 21, 2005.

* cited by examiner

*Primary Examiner*—Stephen Gordon
(74) *Attorney, Agent, or Firm*—Nancy J. Flint; Hunton & Williams LLP

(57) ABSTRACT

The present invention refers to a high tonnage ultra light mining truck with a greater load efficiency for off-road applications that, in addition to the body, comprises a lightweight curved dump body and a knuckle joined lightweight power and traction system, a steering system, and a lateral suspension and tipping system for the lightweight curved dump body. The truck of the present invention has a payload capacity up to three times greater than that of similar trucks of the prior art.

14 Claims, 42 Drawing Sheets

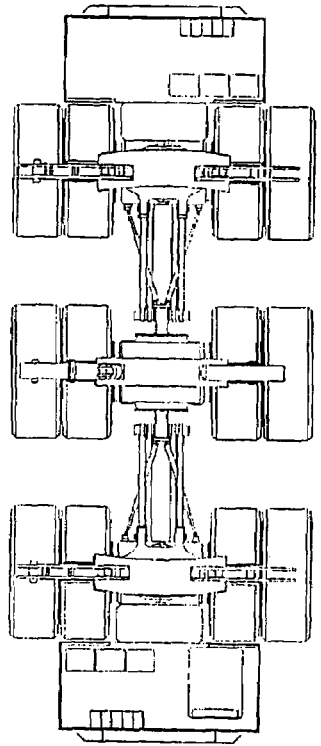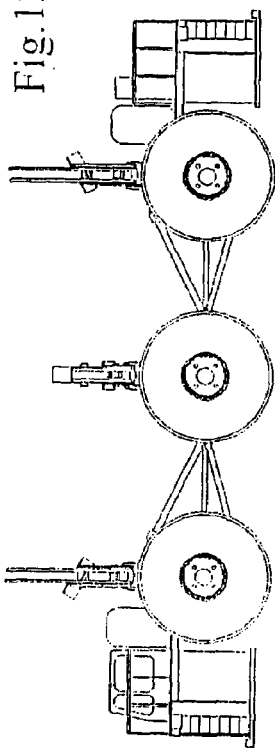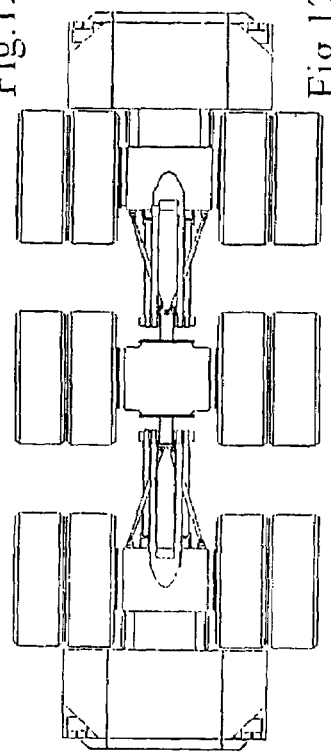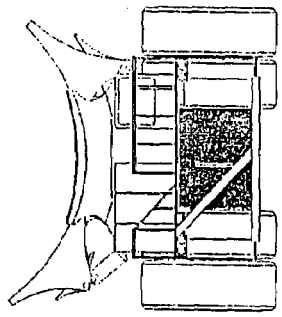

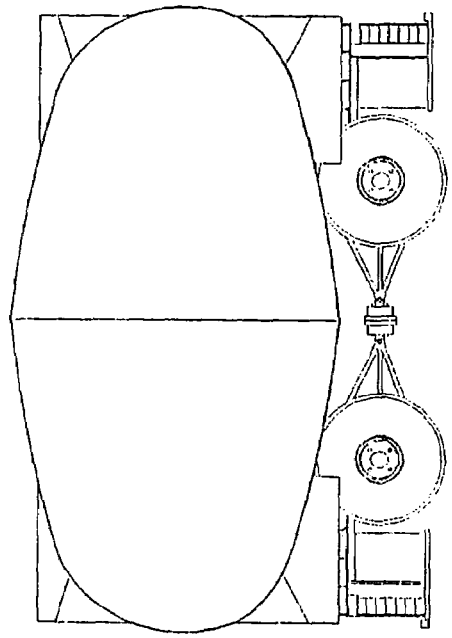
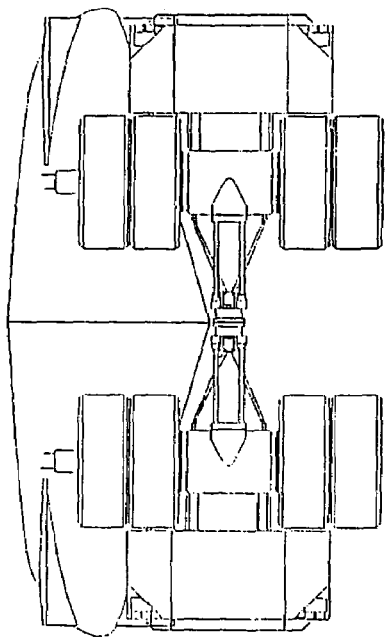
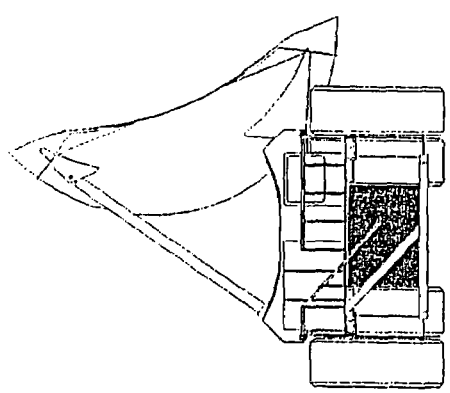
Fig. 33B
Fig. 33C
Fig. 33A

HIGH TONNAGE ULTRA LIGHT MINING TRUCK WITH A GREATER LOAD EFFICIENCY FOR OFF-ROAD APPLICATIONS THAT COMPRISES A LIGHTWEIGHT POWER AND TRACTION SYSTEM, A STEERING SYSTEM AND A LATERAL SUSPENSION AND TIPPING SYSTEM FOR THE LIGHTWEIGHT CURVED DUMP

FIELD OF THE INVENTION

The present invention refers to a high tonnage ultra light mining truck with a greater load efficiency for off-road applications that, in addition to the body, comprises a lightweight curved dump body and a knuckle joined lightweight power and traction system, a steering system, and a lateral suspension and tipping system for the lightweight curved dump body.

BACKGROUND OF THE ART

Trucks built on the basis of a very strong structure of the chassis type, especially freight trucks such as high tonnage trucks, are very well known. The structure of said trucks comprises a rigid axle or axles mounted at the back and a front axle or axles mounted at the front, wherein front wheels turn about two vertical shafts located at the front axle ends of the truck.

In applications of trucks over 100 tons it is not possible to use a double axle or back cross-member due to their huge gross weight that prevents lateral gliding of the tires in the double cross-member when taking curves; this makes driving on curves unsafe because the vehicle tends to move on in a straight direction. For this reason, in this area the prior art makes use of only six tires per vehicle, two on the front axle and four on the rear axle, limiting its payload capacity.

Trucks in the prior art are equipped with electric motors or other types of motors only on the back wheels as it is unfeasible to mount electric motors or motors of other types on the front wheels of the freight vehicle with the steering systems known, limiting in this way its power and consequently, its payload capacity.

The maximum capacity obtained in freight trucks of the prior art is limited by the maximum weight that may be carried by the tires provided in the state of the art, and by the power that may be transmitted by the power and traction systems developed to the present date. The maximum payload a high tonnage truck may carry is given by the equation: Maximum tire and power system capacity (gvw) minus Empty weight of the truck or tare (evw). The truck with the greatest payload efficiency is that with the highest (gvw−evw)/evw ratio.

The maximum payload capacity offered by the state of the art is that of a truck of the following characteristics:

gvw=568 tons.
evw=228 tons.
load=gvw−evw=340 tons.
(gvw−evw)/evw=1.49.

Thus, there is still in the area a need of freight trucks, and more particularly, of lighter high-tonnage freight trucks equipped with a more powerful system, that are more efficient, and that may be used for off-road applications; they must also be provided of a greater number of tires in order to improve the payload capacity and lower the cost per hauled ton. For this reason, lighter power and traction systems are needed to reduce transportation costs while preserving the safety and maneuverability levels of the freight truck.

The truck of the present invention manages to avoid all the above mentioned disadvantages with the replacement of the traditional chassis system for a knuckle joined lightweight, frameless power and traction system.

In this area there is also a need for a dump tipping system that allows to carry out a quicker and more efficient dumping of the materials in freight trucks, and avoids the traditional problems associated with dumping such as having to move from the lane followed during transport to another, forcing the operator to drive in reverse in order to dump the transported load from the back of the truck.

Finally, it is necessary to have lightweight dump bodies that increase payload capacity and allow the implementation of said tipping system. The lightweight curved dump body further comprises a lightweight suspension system that efficiently allows carrying out smooth loading and dumping operations of the material carried in the lightweight curved dump.

SUMMARY OF THE INVENTION

The main purpose of this invention is to provide a high tonnage ultra light mining truck with a greater payload efficiency for off-road applications, built with frameless concept, that exhibits substantially greater benefits with regard to the costs associated per hauled ton, and with regard to truck operation in earth moving applications in the construction of great public works, open-cast mining and underground mining. The truck of the present invention has a payload capacity up to three times greater than that of similar trucks of the prior art. The above, in spite of the fact that the present mining truck makes use of the same components such as power, tires and hydraulic systems used in the prior art, although said elements are presented in an arrangement or assembly different to what is taught or suggested in the prior art.

In addition to the body, the truck of the present invention comprises a lightweight curved dump body and a knuckle joined lightweight power or traction system with three or two rigid axles.

It will be evident for the experts in the art that, by properly combining the elements that will be described hereinafter, it is possible to assemble a truck that, in addition to the body and the lightweight curved dump body, comprises more than three rigid axles.

In the particular case of trucks provided of a system with three rigid axles, this comprises at most two pairs of tires on each axle, that is 4 tires per axle, with a maximum 12-tire arrangement in the truck.

In the particular case of trucks having a system with two rigid axles, this comprises at most two pairs of tires per axle, that is 4 tires per axle, with a maximum 8-tire arrangement in the truck.

The system also permits the independent installation of electric, hydraulic or mechanic motors on each of the wheel pairs at the ends of the rigid axles in the system.

According to the above, in the particular case of the system with three rigid axles, it is possible to mount two motors selected from the electric, hydraulic or mechanic type on each axle, resulting in an arrangement that consists of six motors of the electric, hydraulic or mechanic type mounted close to each of the six pairs of tires, respectively. In another embodiment for the particular case of the system with three rigid axles, two motors selected from those of the electric, hydraulic or mechanic type may be mounted on two of the three axles, resulting in a disposition that consists of four motors of the electric, hydraulic or mechanic type, mounted close to each of the four pairs of tires corresponding to each axle. That is, two motors selected from those of the electric, hydraulic or mechanic type, on the front axle of the truck and two motors selected from those of the electric, hydraulic or mechanic type, on the rear axle of the truck, or two motors selected from those of the electric, hydraulic or mechanic type, on the front axle of the truck and two motors selected from those of the electric, hydraulic or mechanic type, on the central axle of the truck, or two motors selected from those of the electric, hydraulic or mechanic type, on the central axle of the truck and two motors selected from those of the electric, hydraulic or mechanic type, on the rear axle of the track.

In another embodiment for the particular case of the system with three rigid axles, two motors selected from those of the electric, hydraulic or mechanic type, may be mounted on one of the three axles, resulting in an arrangement that consists of two motors selected from the electric, hydraulic or mechanic type mounted close to each of the two pairs of tires corresponding to the axle. That is, two motors selected from those of the electric, hydraulic or mechanic type, on the front axle of the truck; or two motors selected from those of the electric, hydraulic or mechanic type, on the central axle of the truck; or two motors selected from those of the electric, hydraulic or mechanic type, on the rear axle of the truck.

In the case of the system with two rigid axles, two motors selected from those of the electric, hydraulic or mechanic type may be mounted on each axle, resulting in an arrangement that consists of four motors of the electric, hydraulic or mechanic type, mounted close to each pair of the four pairs of tires, respectively.

In another embodiment for the particular case of the system with two rigid axles, two motors of the electric, hydraulic or mechanic type, may be placed on one of the two axles, resulting in an arrangement that consists of two motors selected from those of the electric, hydraulic or mechanic type, mounted close to each of the two pair of tires corresponding to the axle. That is, two motors selected from those of the electric, hydraulic or mechanic type, on the front axle of the truck; or two motors selected from those of the electric, hydraulic or mechanic type, on the rear axle of the truck.

One or more power modules selected from those of the diesel-electric type, diesel-hydraulic type or diesel-pneumatic type energize the motors selected from those of the electric, hydraulic or mechanic type in the system.

Preferably, two or more power modules selected from those of the diesel-electric, diesel-hydraulic or diesel-mechanic type energize the motors selected from those of the electric, hydraulic or mechanic type. Said power modules are located at the front end of the truck, or at the rear end of the truck or at each end of the truck, as it may correspond.

Preferably, in the cases of systems with three rigid axles as well as of those with two rigid axles, said motors selected from those of the electric, hydraulic or mechanic type are located close to each pair of tires, said motors being energized by two power modules selected from those of the diesel-electric, diesel-hydraulic or diesel-mechanic type, mounted at the front end of the truck and at the rear end of the truck, respectively.

In the case of the truck with a lightweight power and traction system and three rigid axles, said axles are joined to the others by a knuckle joint system that consists of two very light symmetric structures, each formed by four tubular bars, joined to the central axle by means of two pins that allow rotation, and fixing the two structures to two vertical rotary plates located at both sides of the central axle and to four horizontal rotary plates, two of which are placed on the front axle, one on top of the central portion and the other at the bottom of the central portion, and two of which are placed on the rear axle, one on top of the central portion and the other at the bottom of the central portion. This configuration prevents the occurrence of torques and bending moments generated by the load and the unevenness of the road. Said configuration permits as well to form the freight vehicle steering system by rotating the two axles of the ends at equal angles but in an opposite direction. Four hydraulic cylinders, two that rotate the front axle and two that rotate the rear axle at equal but opposite angles accomplish this rotation.

In another preferred embodiment, the mining truck may comprise two rigid axles, said rigid axles being joined to each other by a knuckle joint system that consists of two very light symmetric structures, each formed by four tubular bars that are joined to a rotary vertical plate in the center, a rotary plate located on top of the central portion and another rotary plate located at the bottom of the central portion on the front axle as well as on the rear axle, that form the knuckle joint; this prevents torque generation due to load and unevenness of the road. Moreover, said structures permit to form the mining truck steering system with two rigid axles, actuated in the same way as in the case of three rigid axles.

It will be evident for an expert in the art that the above described mining truck may be modified to incorporate in addition a series of reinforcements that allow the system to resist or support the load to which it will be subjected, a load that otherwise is variable and depends on the application of the vehicle comprising the present system. Therefore, it is intended that every modification in this or in a similar sense shall be included within the scope of the present invention.

The mining truck of the present invention further comprises a steering system that operates to rotate the end axles, either in the truck with three rigid axles or in the truck with two rigid axles, at equal but opposite angles, allowing the vehicle to turn without a lateral gliding of the wheels; this minimizes tire wear and also permits an accurate and safe steering.

Another purpose of the present invention is a mining truck that incorporates a knuckle joint lightweight power and traction system comprised of two or three rigid axles.

The present invention preferably refers to a mining truck comprised of three rigid axles, with a fixed central axle and rotary end axles that, in addition, is extremely light and permits to reduce transportation costs in about 40%, although using the same power and transmission systems and the same tires known to the present but assembled or arranged differently to those taught or suggested in the prior art.

The load ratio in this particular case of three rigid axles is: (GVW−EVW/EVW=1140 t−220 t)/240 t=3.83. This ratio of load to empty weight of the truck is 2,6 times greater than that obtainable in the prior art.

Another purpose of the present invention is a mining truck that incorporates a knuckle joined lightweight power and traction system with two rigid and rotary axles, this vehicle being extremely lightweight and permitting to reduce transportation costs in about 30% using the same power and transmission systems and the same tires known to the present date but assembled or arranged differently to what is taught or suggested in the prior art.

In this particular case of two rigid axles the load ratio is (GVW−EVW)/EVW=(780 t−180 t)/180 t=3.33. This ratio of load to empty weight of the truck is 2.2 times greater than that obtainable in the state of the art.

The mining truck of the present application also comprises a lightweight curved dump body built from two or three cylindrical steel sections joined at an angle that form the container, this dump body comprising two sections when the truck exhibits a structure with two rigid axles, and the dump body comprising three sections when the truck exhibits a structure with three rigid axles.

The lightweight curved dump body rests on a system that consists, respectively, of two or three transverse structures mounted on the rigid axles, this number depending on the provision of two or three rigid axles in the truck, mounted on said rigid axles by means of a sliding central pin and two pneumatic-hydraulic cylinders or helical springs at the ends.

The lightweight curved dump body also incorporates a suspension system comprised of a plurality of pneumatic-hydraulic cylinders or helical springs that are mounted between the transverse beds and the rigid axles, and a sliding central pin that acts as a guide of the system. Particularly, the lightweight curved dump body incorporates a suspension system that consists of two or three transverse beds mounted on the two or three rigid axles, respectively.

In this way, the load is transferred from the lightweight curved dump body directly to the ground through each rigid axle, eliminating the requirement of a chassis. In the particular case of the knuckle joined lightweight power and traction system with two or three rigid axles, the load is transferred directly to the ground through the two or three rigid axles, respectively.

The truck of the present invention further comprises a side tipping system for a lightweight curved dump body, which consists of two or three hydraulic raising cylinders. The opposite portion of the dump body also comprises the same number of rotary hinge-like supporting elements.

The high tonnage, ultra light mining truck with a greater payload efficiency for off-road applications of the present invention may be selected, among others, from freight trucks to be used in every type of mining applications, preferably large mining applications, and specifically for hauling barren material and ore.

BRIEF DESCRIPTION OF THE FIGURES

FIG. 12A is a front view of a preferred embodiment of the mining truck with three rigid axles of the present invention omitting the lightweight curved dump body and showing the configuration of the axle connecting structure in the mining truck.

FIG. 12B is a top view of a preferred embodiment of the mining truck with three rigid axles of the present invention omitting the lightweight curved dump body and showing the configuration of the axle connecting structure in the mining truck.

FIG. 12C is a side view of a preferred embodiment of the mining truck with three rigid axles of the present invention omitting the lightweight curved dump body and showing the configuration of the axle connecting structure in the mining truck.

FIG. 12D is a bottom view of a preferred embodiment of the mining truck with three rigid axles of the present invention omitting the lightweight curved dump body and showing the configuration of the axle connecting structure in the mining truck.

FIG. 33A is a front view of a preferred embodiment of the mining truck with two rigid axles of the present invention, carrying out a tipping action.

FIG. 33B is a side view of a preferred embodiment of the mining truck with two rigid axles of the present invention, carrying out a tipping action.

FIG. 33C is a bottom view of a preferred embodiment of the mining truck with two rigid axles of the present invention, carrying out a tipping action.

DETAILED DESCRIPTION OF THE INVENTION

Figure 1:
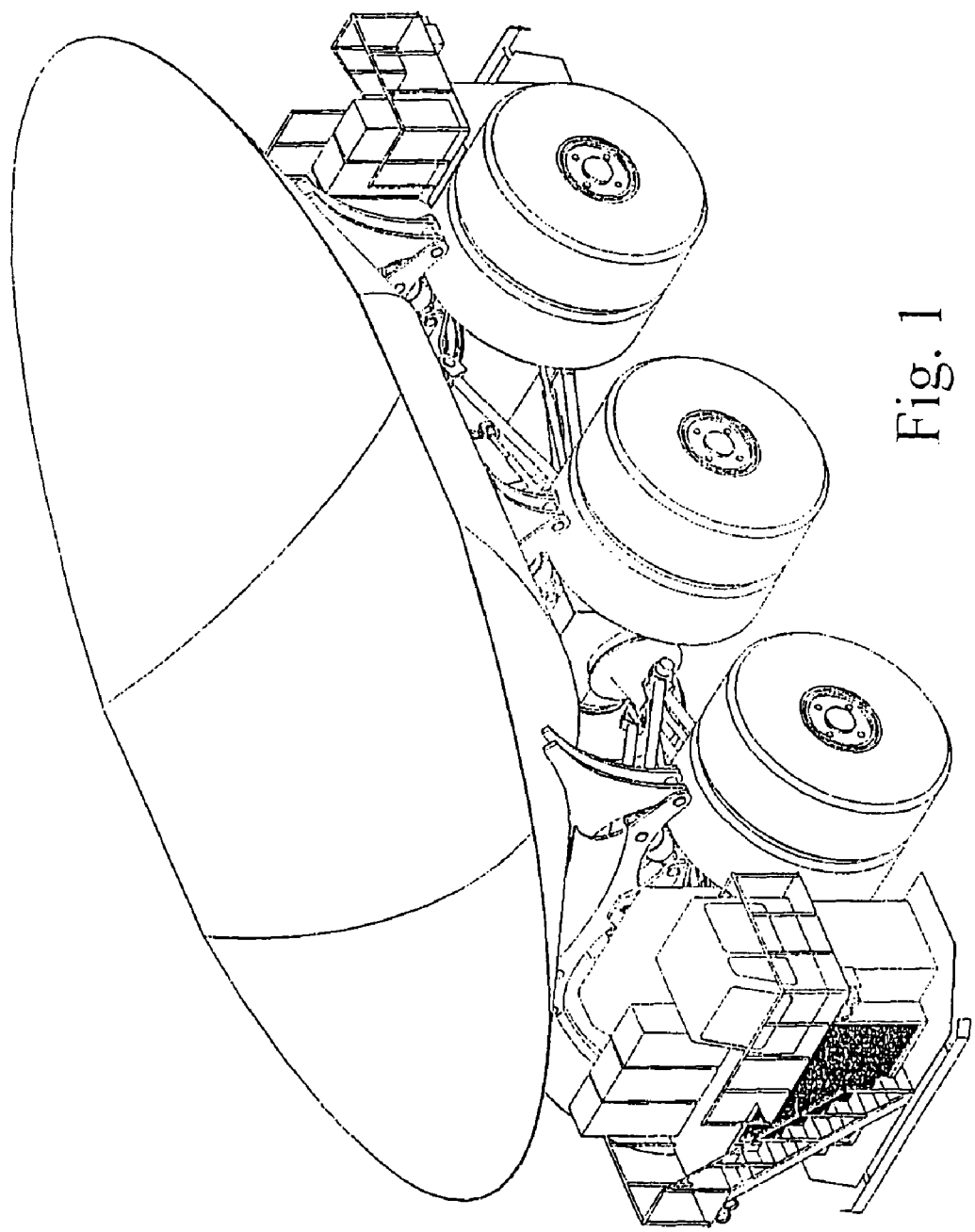
FIG. 1 is a perspective view from an upper angle of a preferred embodiment of the mining truck with three rigid axles of the present invention, showing its left front portion.
Figure 2:
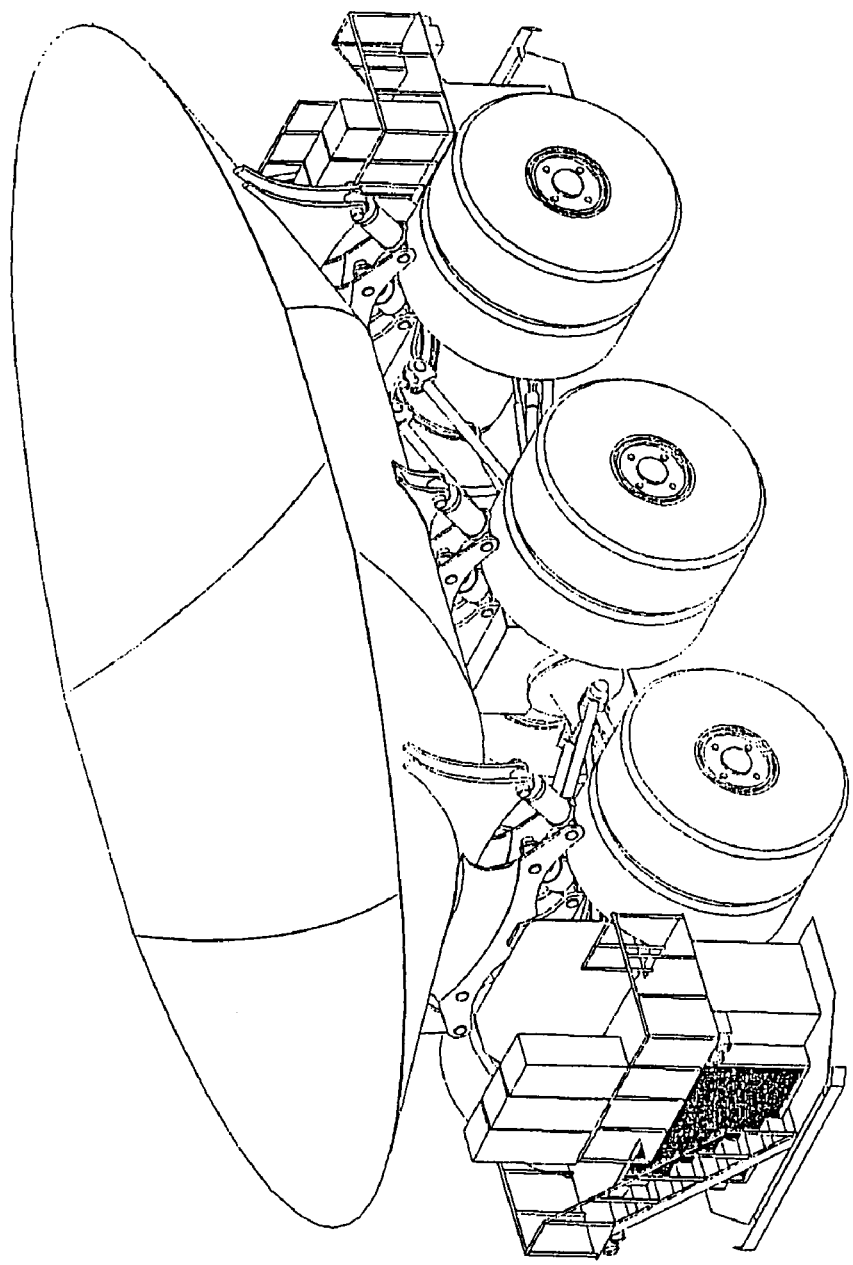
FIG. 2 is a perspective view from an upper angle of a preferred embodiment of the mining truck of the present invention that illustrates a freight vehicle with three rigid axles, showing its right rear portion.
Figure 3:
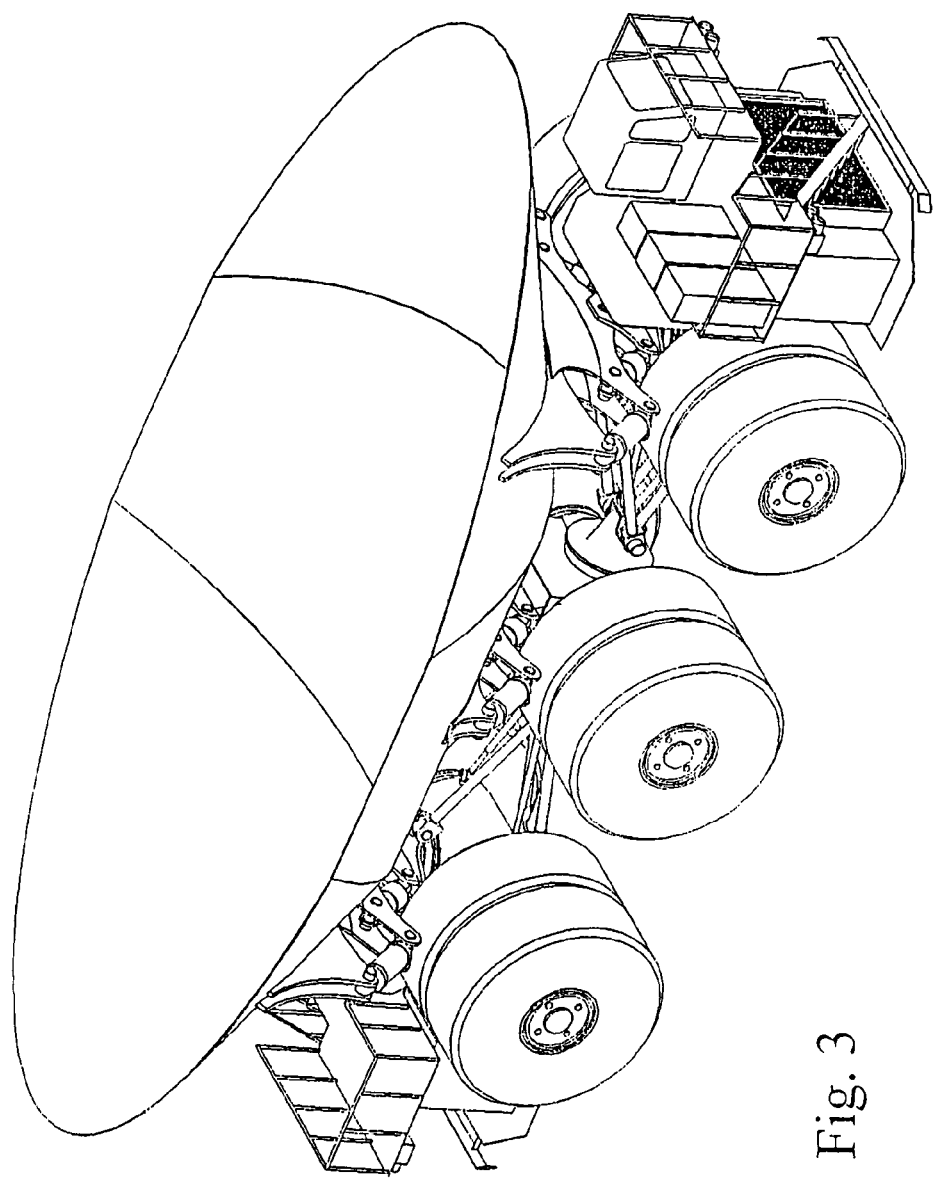
FIG. 3 is a perspective view from an upper angle of a preferred embodiment of the mining truck with three rigid axles of the present invention, showing its right front portion.
Figure 4:
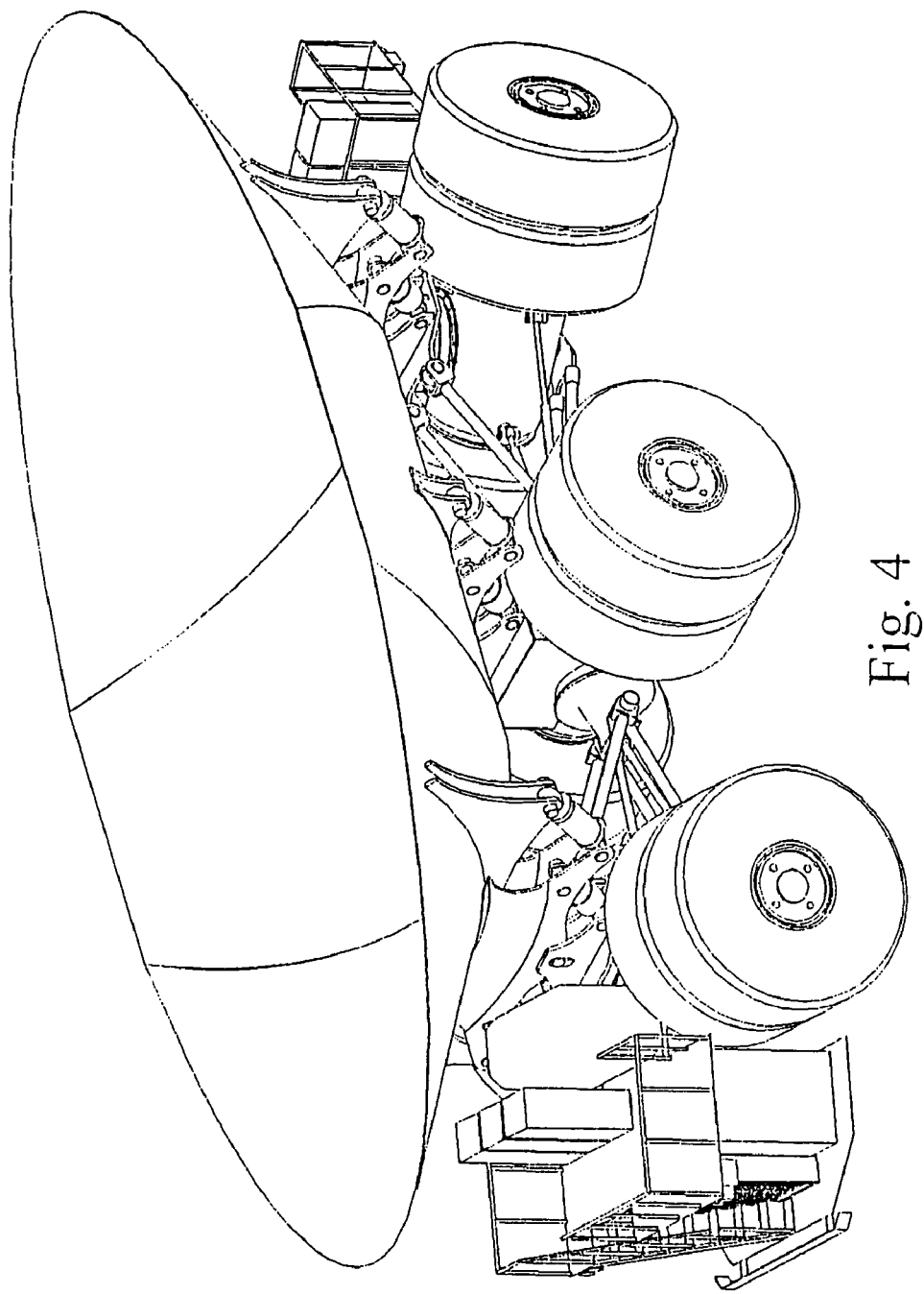
FIG. 4 is a perspective view from an upper angle of a preferred embodiment of the mining truck with three rigid axles of the present invention that shows its right front portion, turning to the left and showing the three raising cylinders of the lightweight curved dump body for the tipping action.
Figure 5:
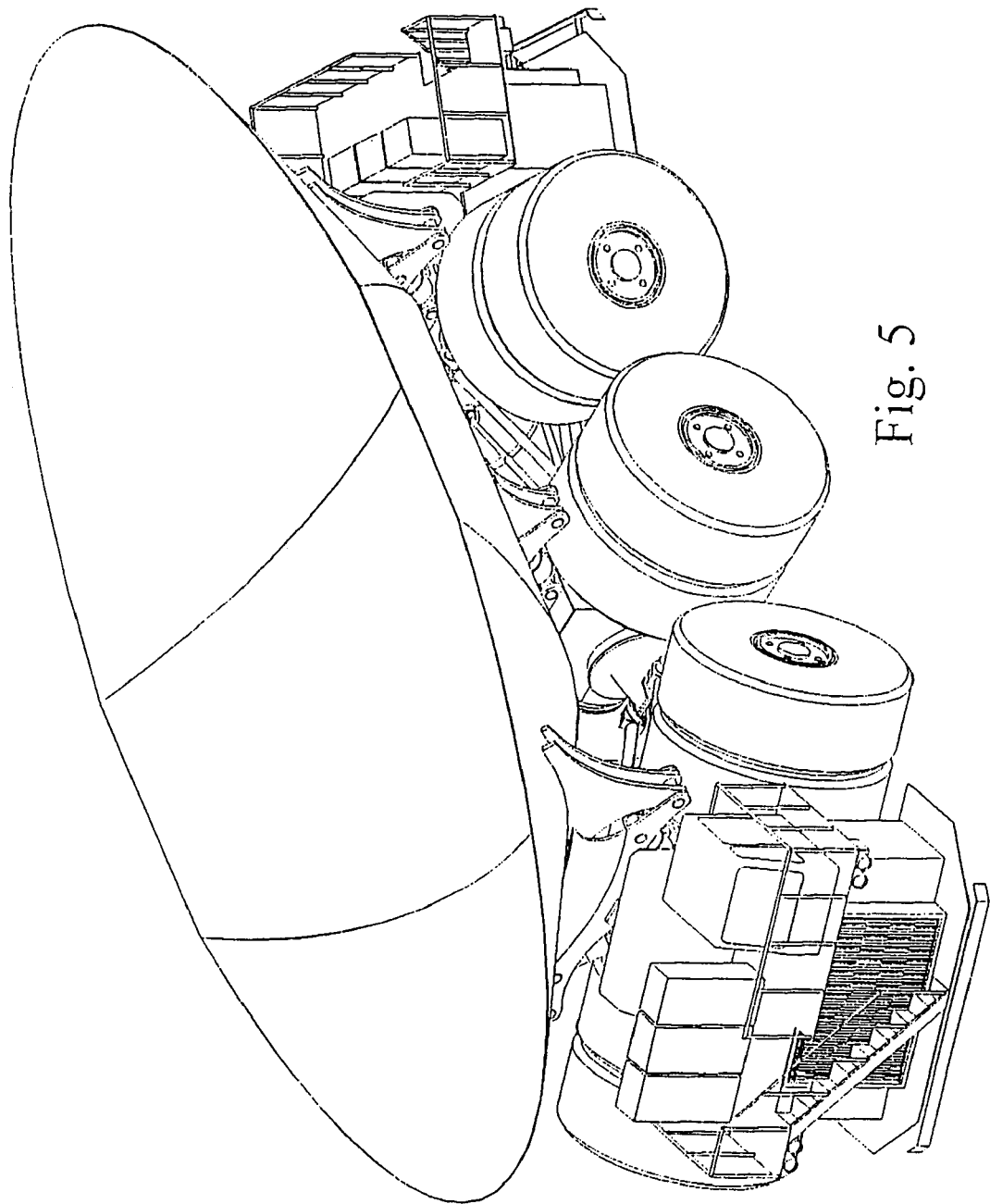
FIG. 5 is a perspective view from an upper angle of a preferred embodiment of the mining truck with three rigid axles of the present invention, showing its left front portion and turning to the left.
Figure 6:
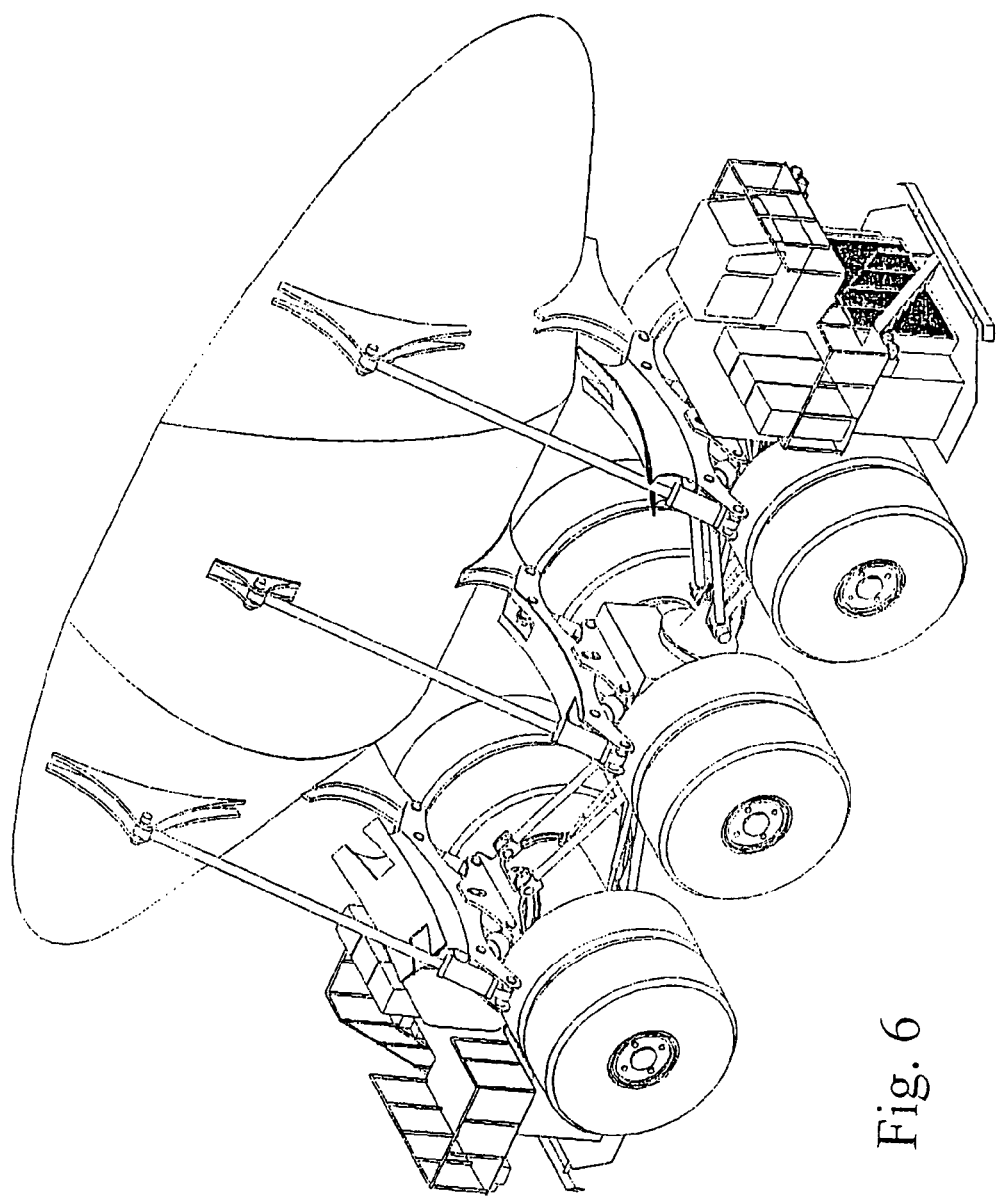
FIG. 6 is a perspective view from an upper angle of a preferred embodiment of the mining truck with three rigid axles of the present invention, showing its right front portion and performing a tipping action or load dumping.
Figure 7:
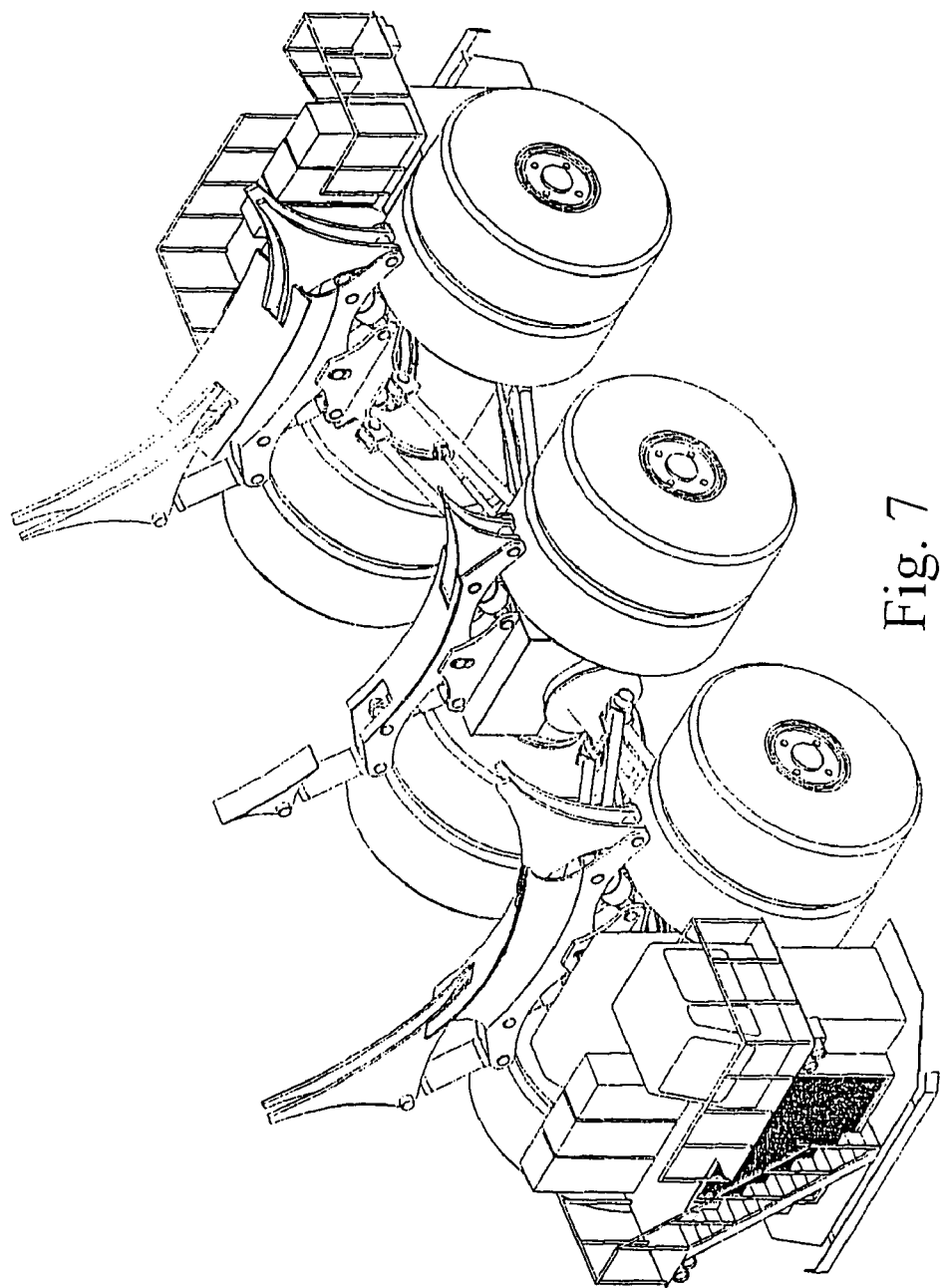
FIG. 7 is a perspective view from an upper angle of a preferred embodiment of the mining truck with three rigid axles of the present invention, omitting the lightweight curved dump and showing the axle connecting structure.
Figure 8:
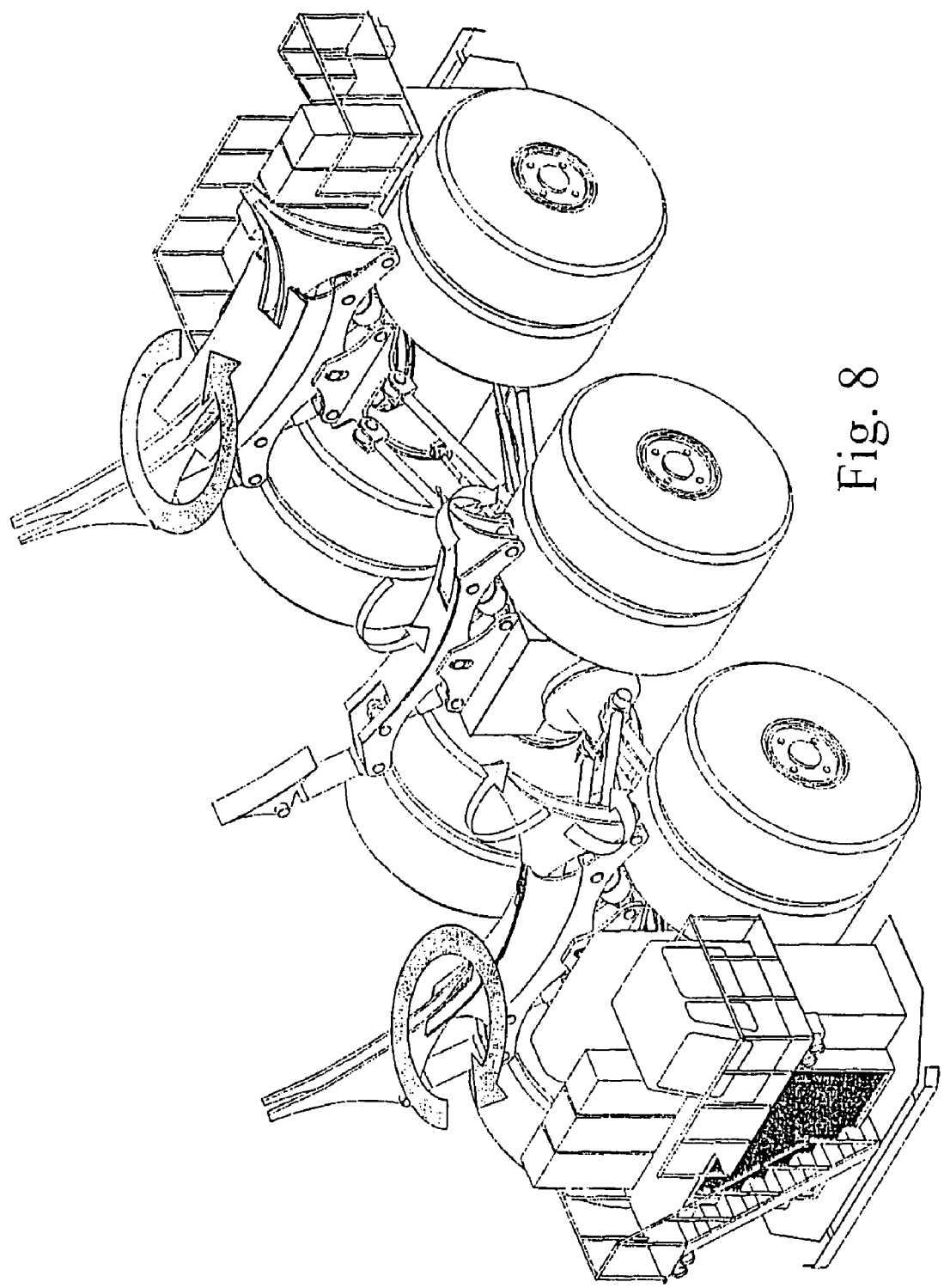
FIG. 8 is a perspective view from an upper angle of a preferred embodiment of the mining truck with three rigid axles of the present invention, omitting the lightweight curved dump body and showing the knuckle joints of the axle connecting structure.
Figure 9C:
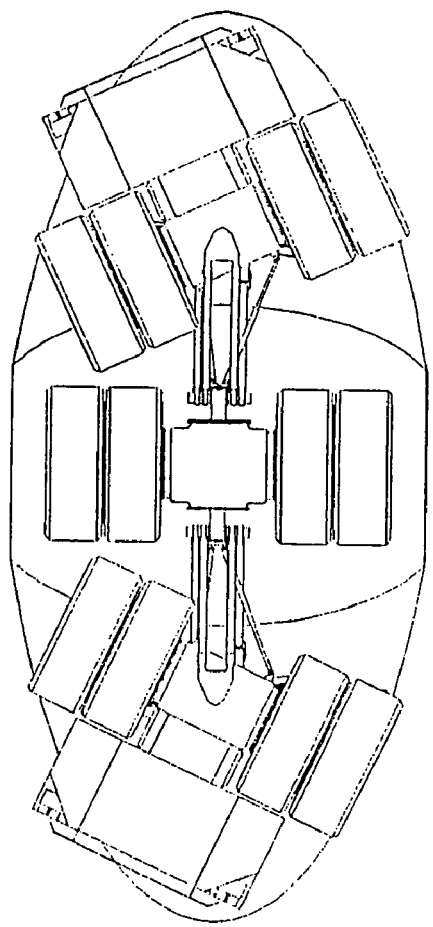
FIG. 9C is a bottom view of a preferred embodiment of the mining truck with three rigid axles of the present invention.
Figure 9B:
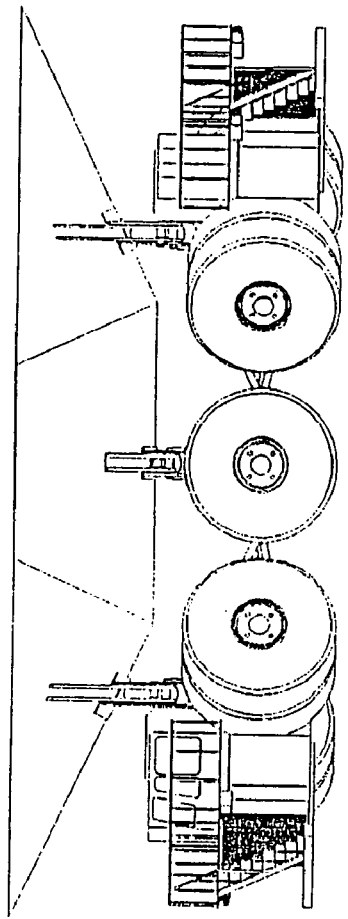
FIG. 9B is a side view of a preferred embodiment of the mining truck with three rigid axles of the present invention.
Figure 9A:
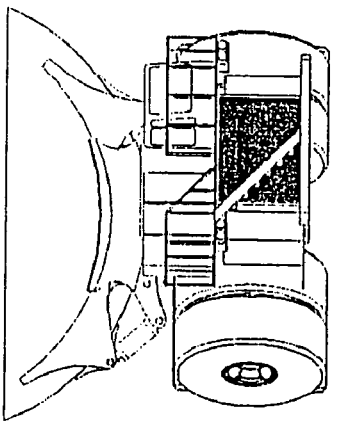
FIG. 9A is a front view of a preferred embodiment of the mining truck with three rigid axles of the present invention.
Figure 10C:
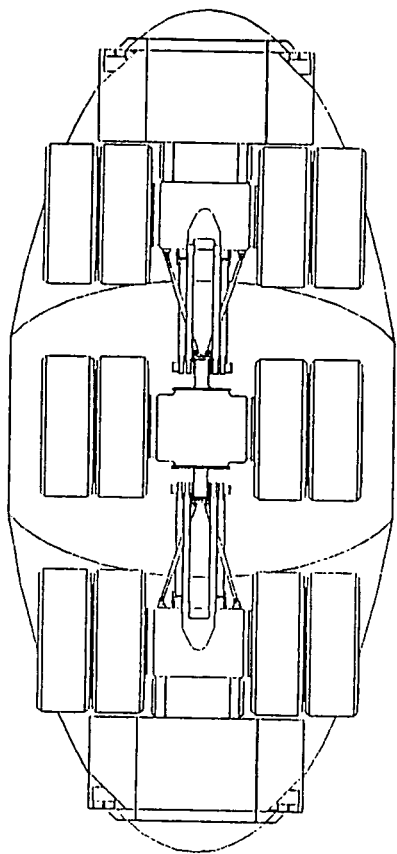
FIG. 10C is a bottom view of a preferred embodiment of the mining truck with three rigid axles of the present invention, turning to the left.
Figure 10B:
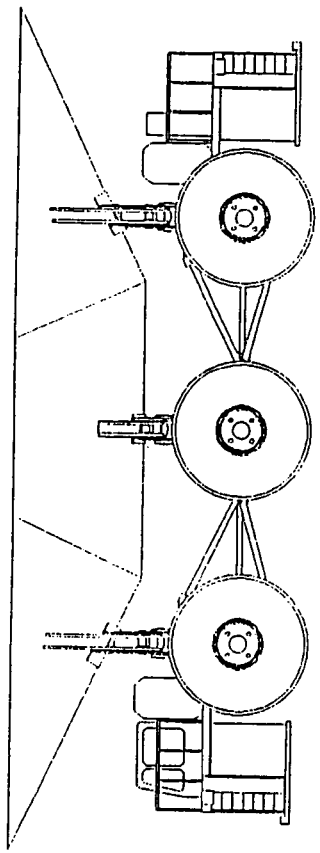
FIG. 10B is a side view of a preferred embodiment of the mining truck with three rigid axles of the present invention, turning to the left.
Figure 10A:
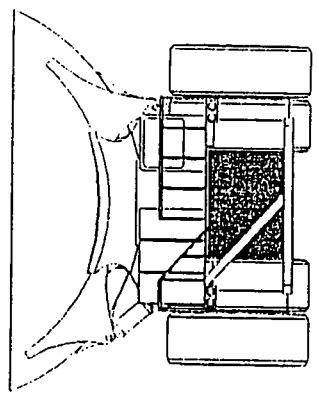
FIG. 10A is a front view of a preferred embodiment of the mining truck with three rigid axles of the present invention, turning to the left.
Figure 11B:
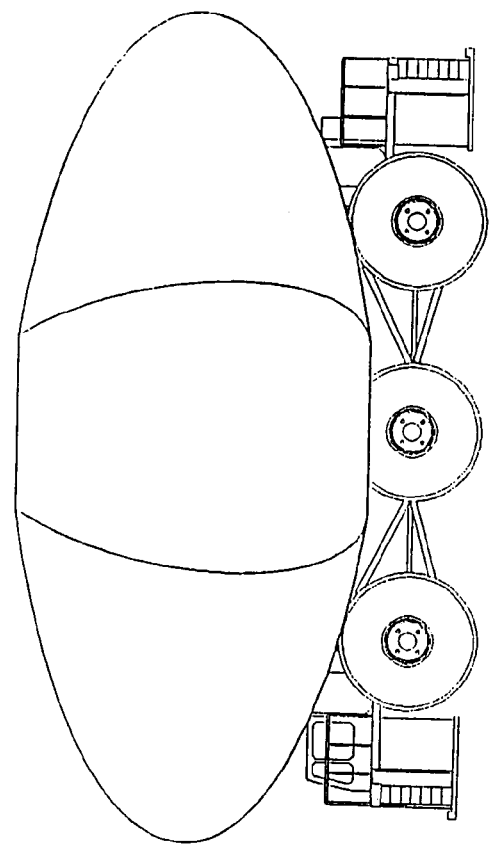
FIG. 11B is a side view of a preferred embodiment of the mining truck with three rigid axles of the present invention, performing a tipping action.
Figure 11C:
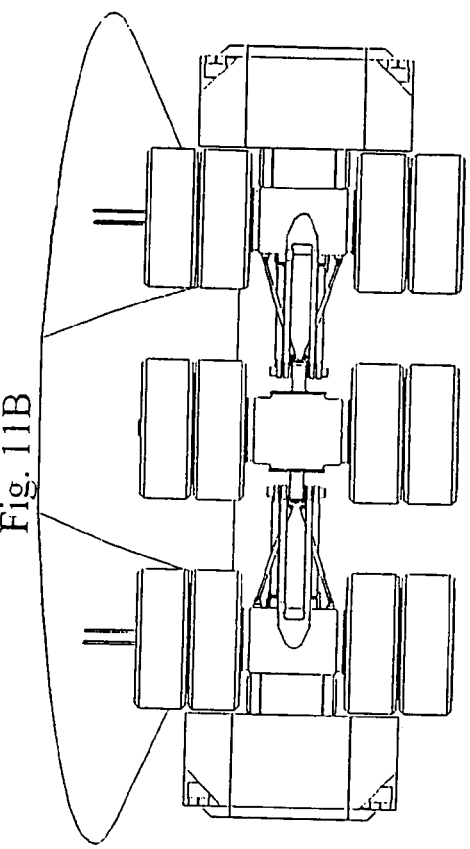
FIG. 11C is a bottom view of a preferred embodiment of the mining truck with three rigid axles of the present invention, performing a tipping action.
Figure 11A:
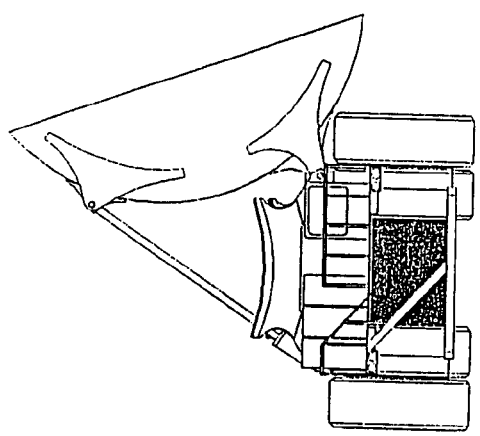
FIG. 11A is a front view of a preferred embodiment of the mining truck with three rigid axles of the present invention, performing a tipping action.
Figure 13:
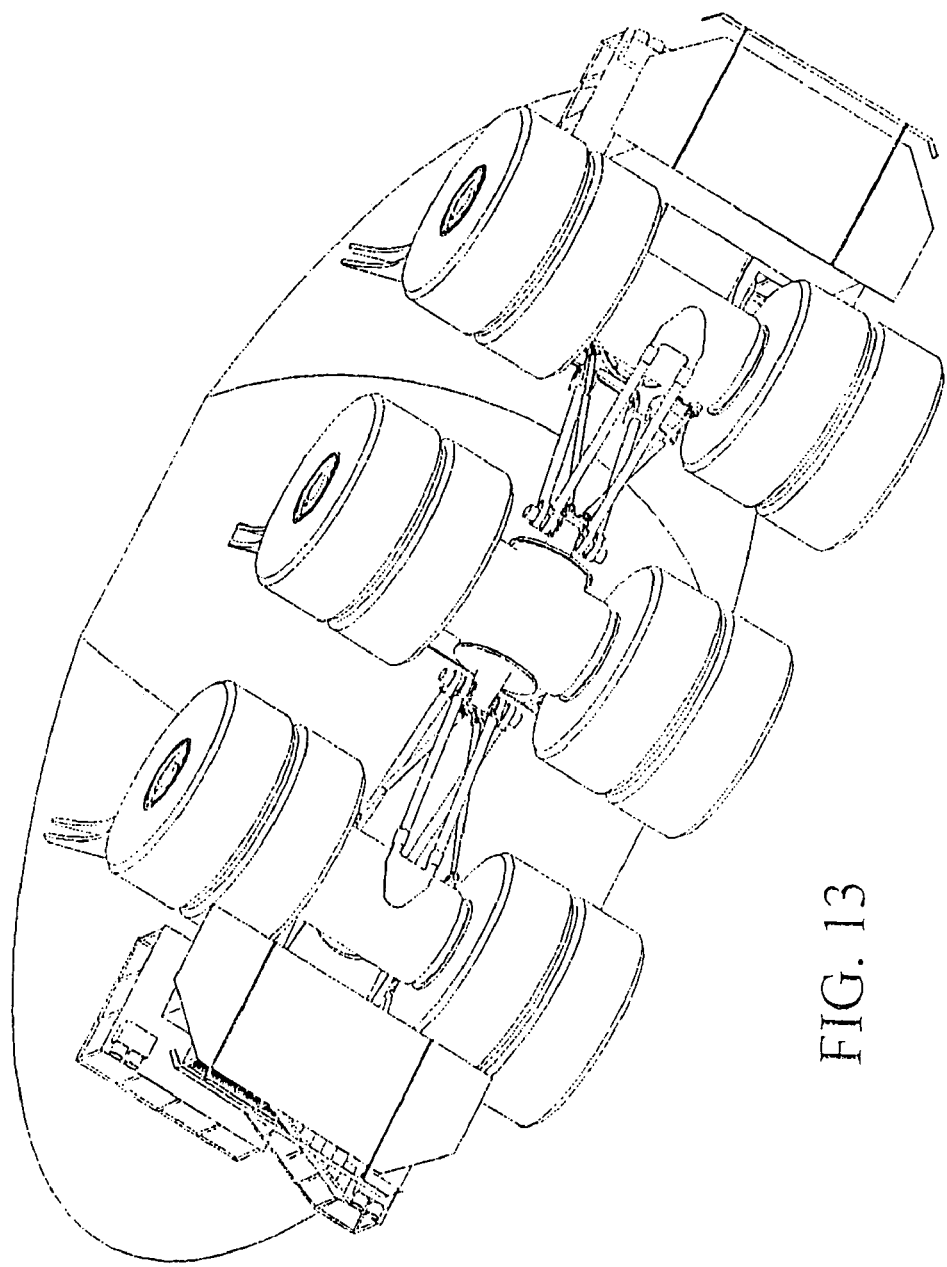
FIG. 13 is a perspective view from a lower angle of a preferred embodiment of the mining truck with three rigid axles of the present invention, showing its left rear portion.
Figure 14:
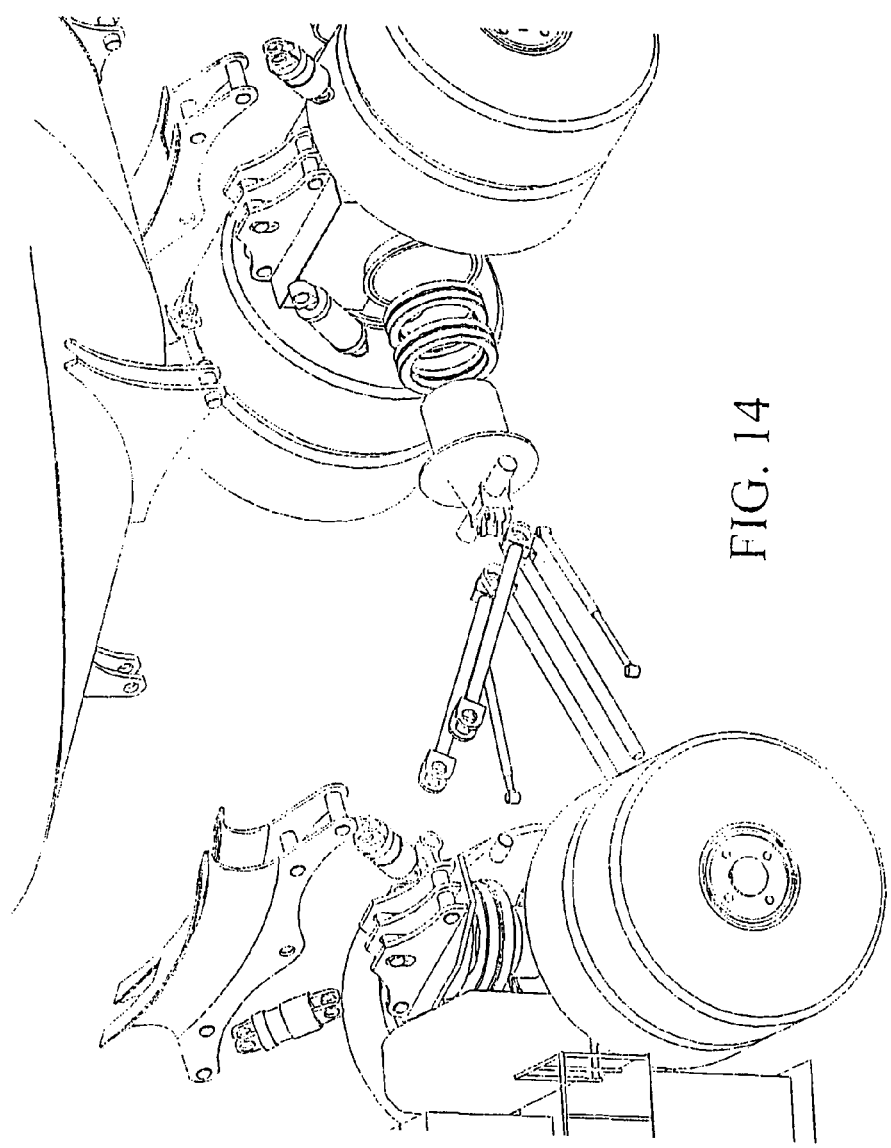
FIG. 14 is a perspective view from an upper angle of a preferred embodiment of the mining truck with three rigid axles of the present invention, showing in exploded view the elements that make up the knuckle joined lightweight power and traction system, the steering system and the suspension system, at the front portion of the mining truck.
Figure 15:
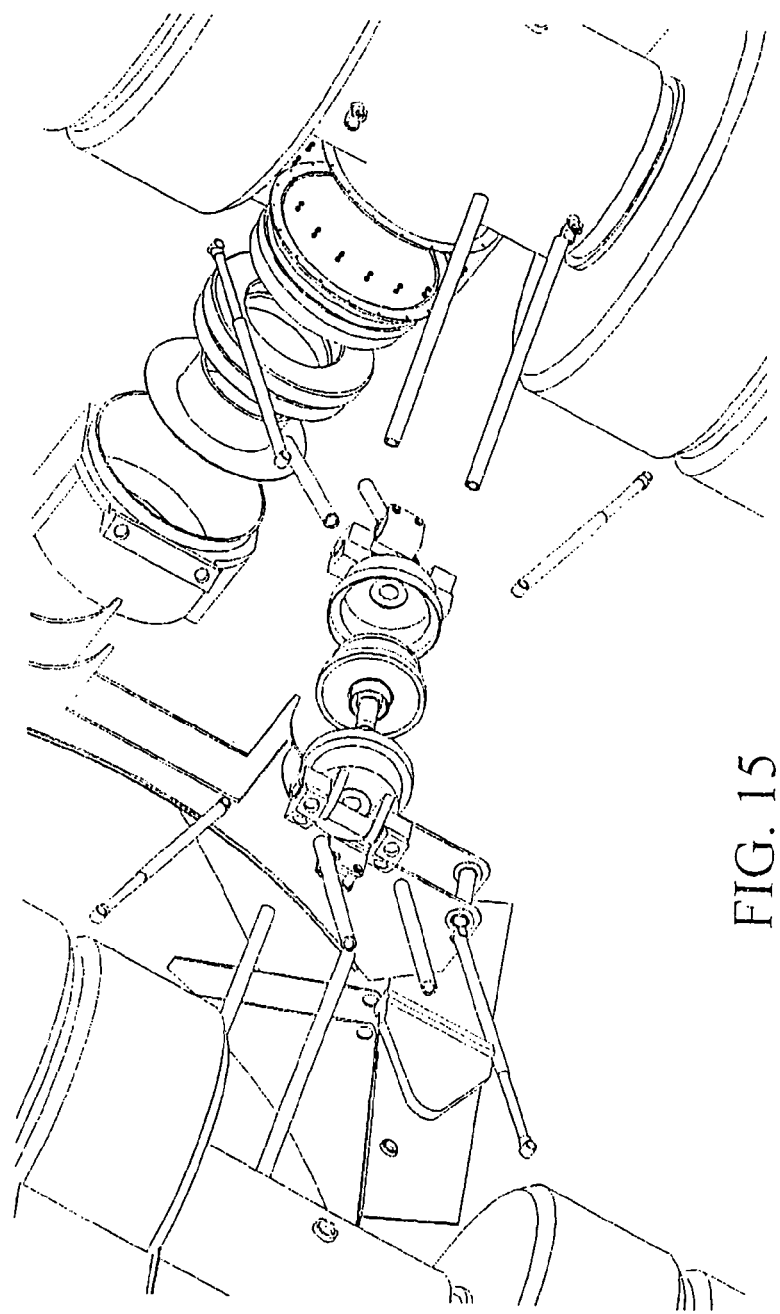
FIG. 15 is a perspective view from a lower angle of a preferred embodiment of the mining truck with three rigid axles of the present invention, showing in exploded view the parts compounding the elements that make up the knuckle joined lightweight power and traction system, the steering system and the suspension system, at the front portion of the mining truck.
Figure 16:
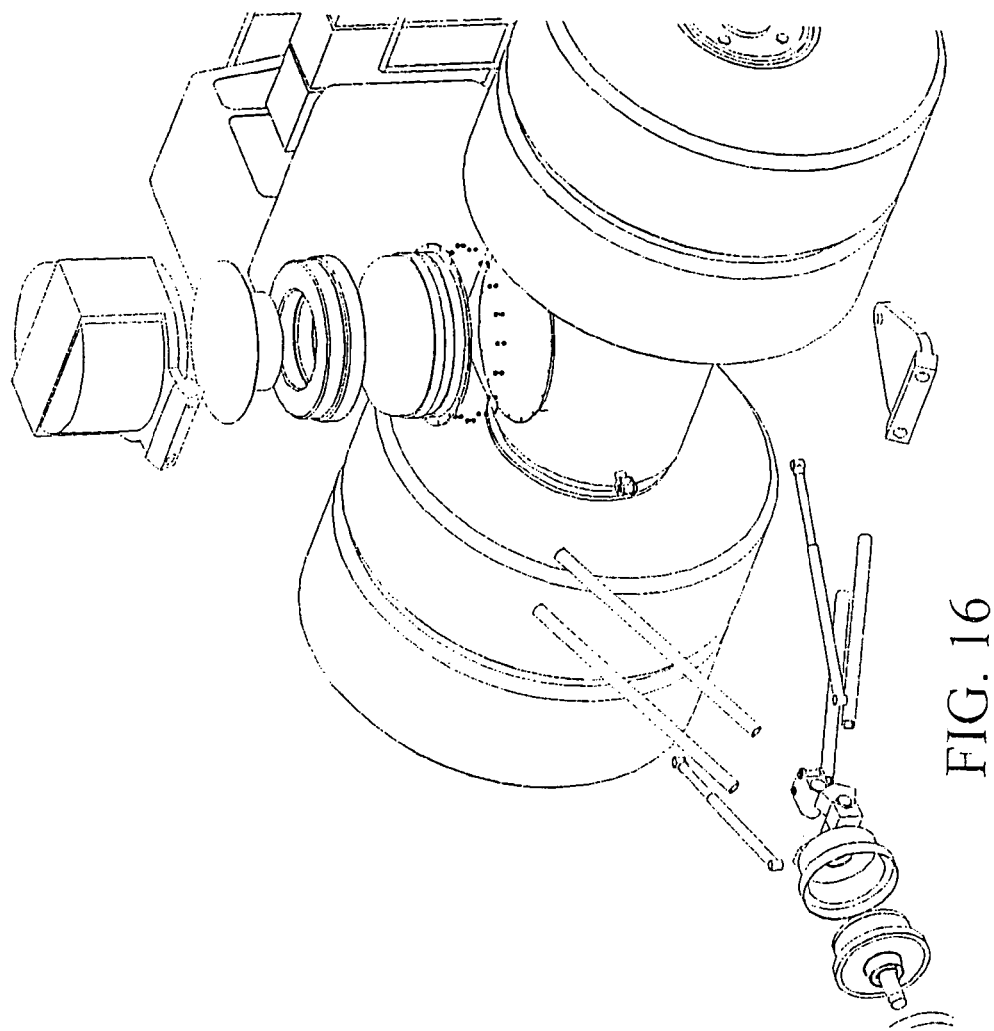
FIG. 16 is a perspective view from an upper angle of a preferred embodiment of the mining truck with three rigid axles of the present invention, showing in exploded view the parts compounding the elements that make up the knuckle joined lightweight power and traction system, the steering system and the suspension system, at the front portion of the mining truck.
Figure 17:
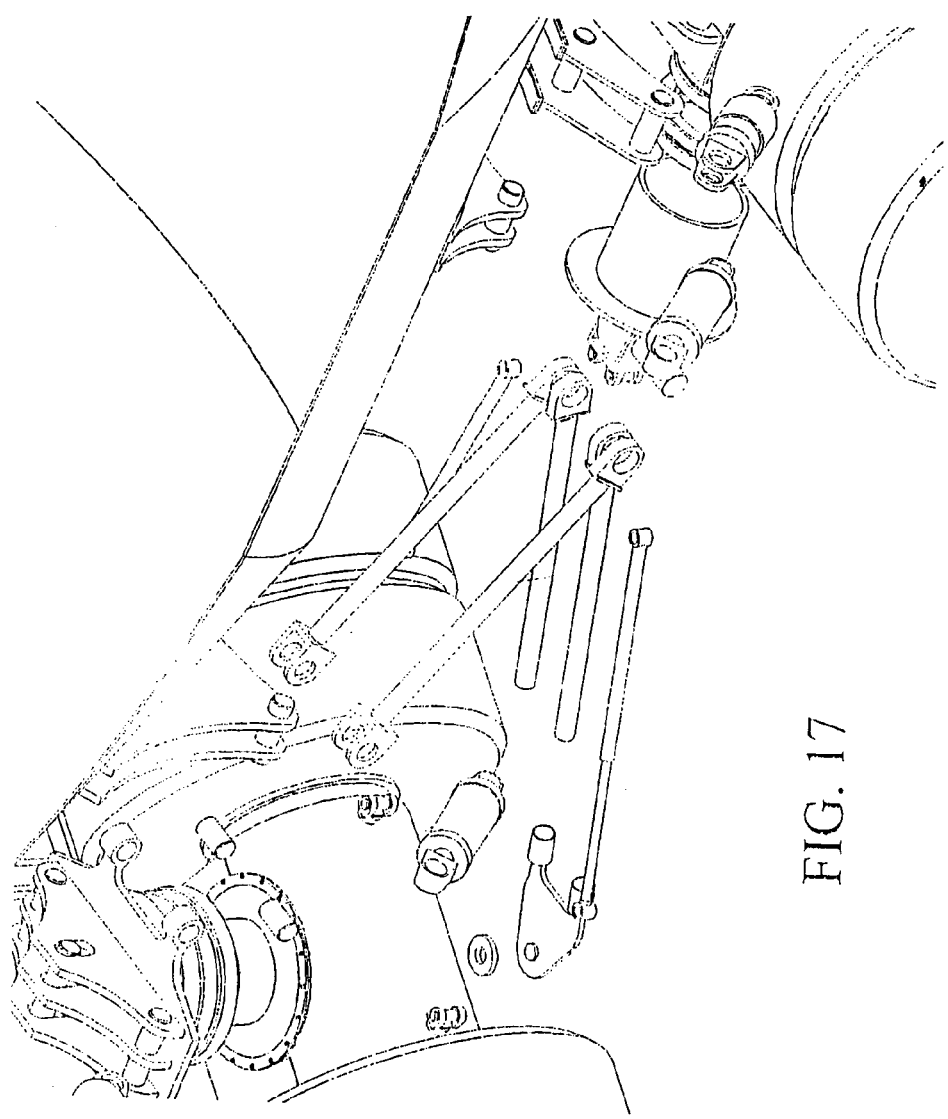
FIG. 17 is a perspective view from a side angle of a preferred embodiment of the mining truck with three rigid axles of the present invention, showing in exploded view the parts compounding the elements that make up the knuckle joined lightweight power and traction system, the steering system and the suspension system, at the front portion of the mining truck.
Figure 18:
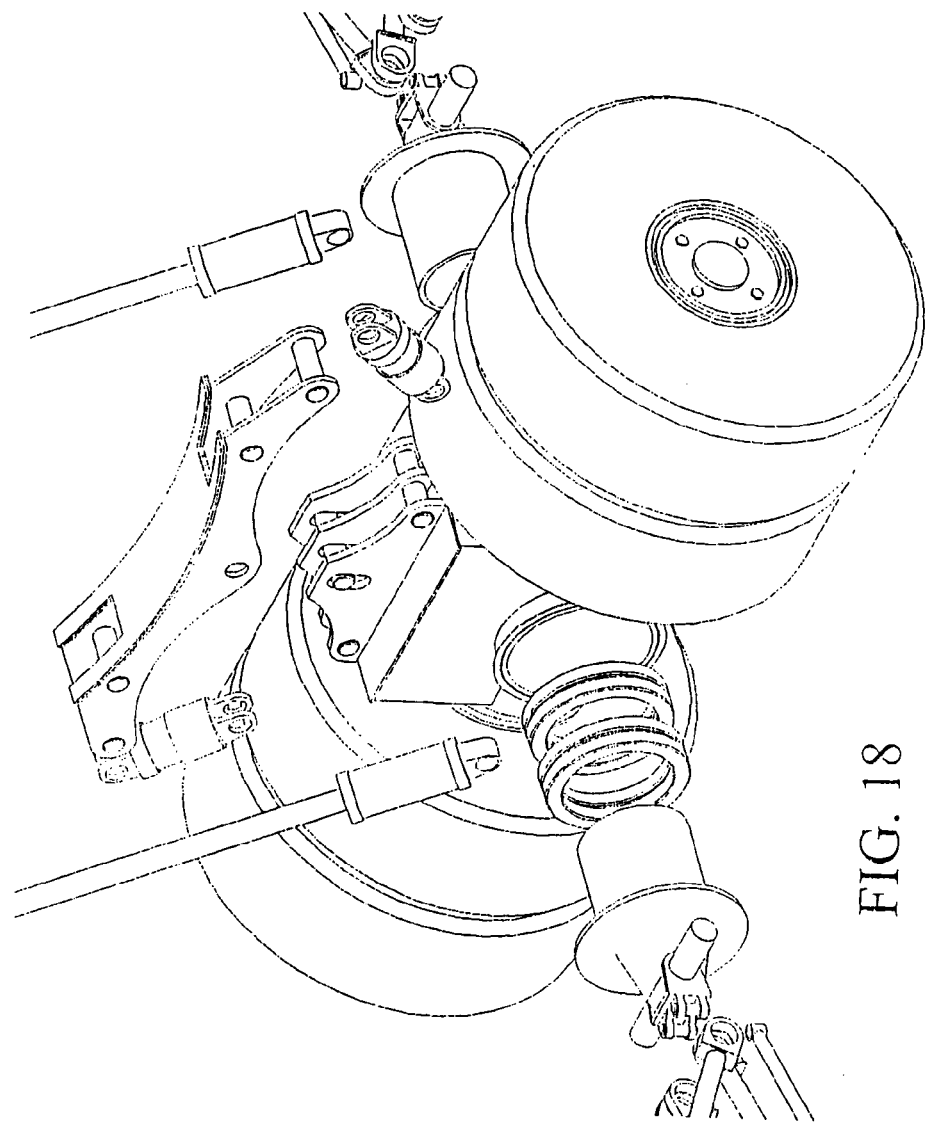
FIG. 18 is a perspective view from a side angle of a preferred embodiment of the mining truck with three rigid axles of the present invention, showing in exploded view the parts compounding the elements that make up the knuckle joined lightweight power and traction system, the steering system and the suspension system, at the middle portion of the mining truck.
Figure 19:
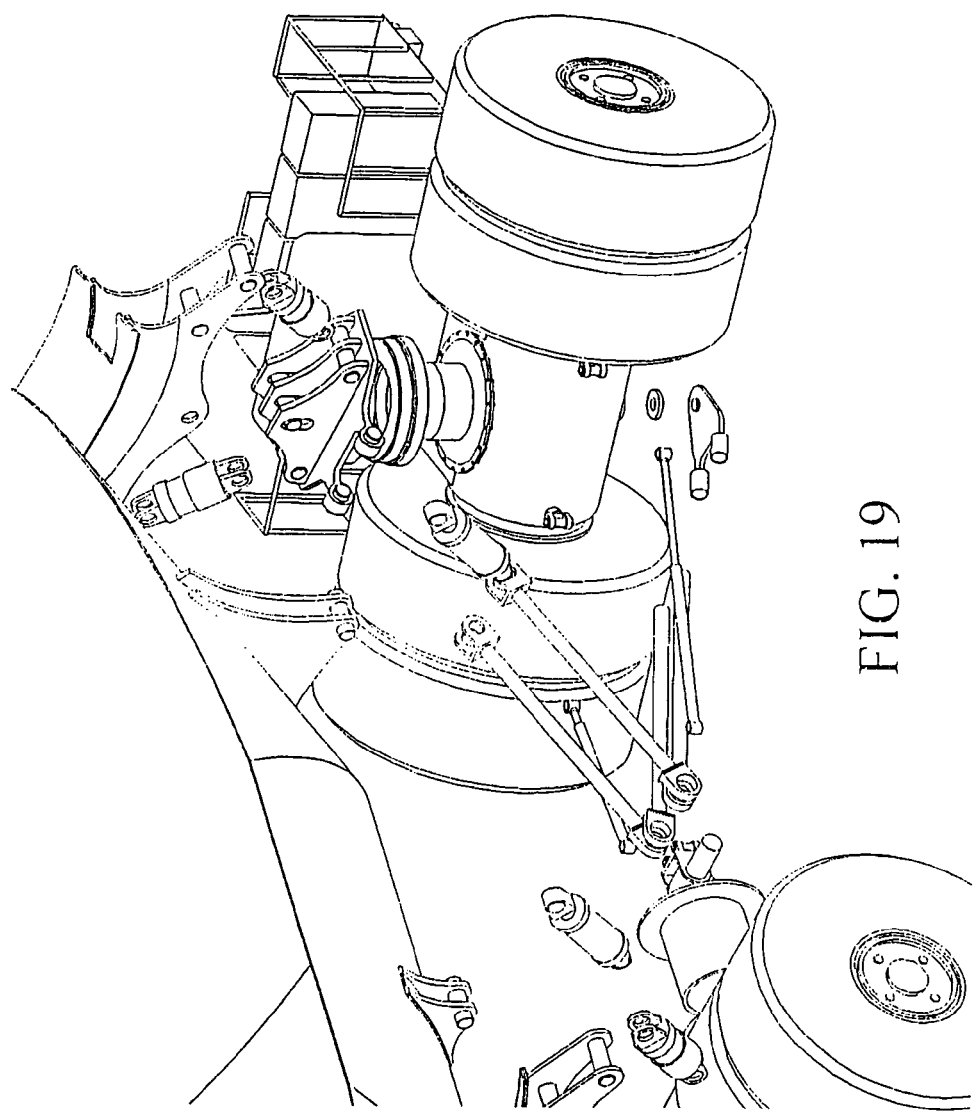
FIG. 19 is a perspective view from a side angle of a preferred embodiment of the mining truck with three rigid axles of the present invention, showing in exploded view the parts compounding the elements that make up the knuckle joined lightweight power and traction system, the steering system and the suspension system, at the rear portion of the mining truck.
Figure 20:
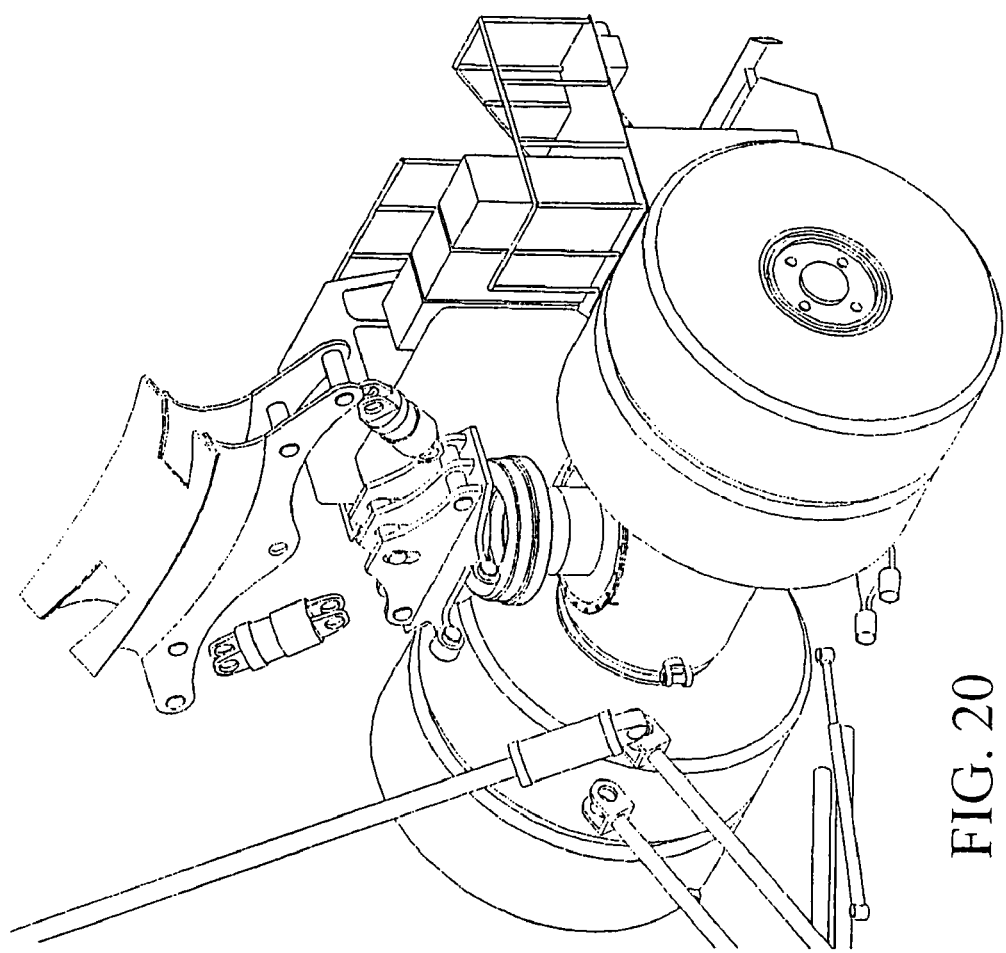
FIG. 20 is a perspective view from a side angle of a preferred embodiment of the mining truck with three rigid axles of the present invention, showing in exploded view the parts compounding the elements that make up the knuckle joined lightweight power and traction system, the steering system and the suspension system, at the rear portion of the mining truck.
Figure 21:
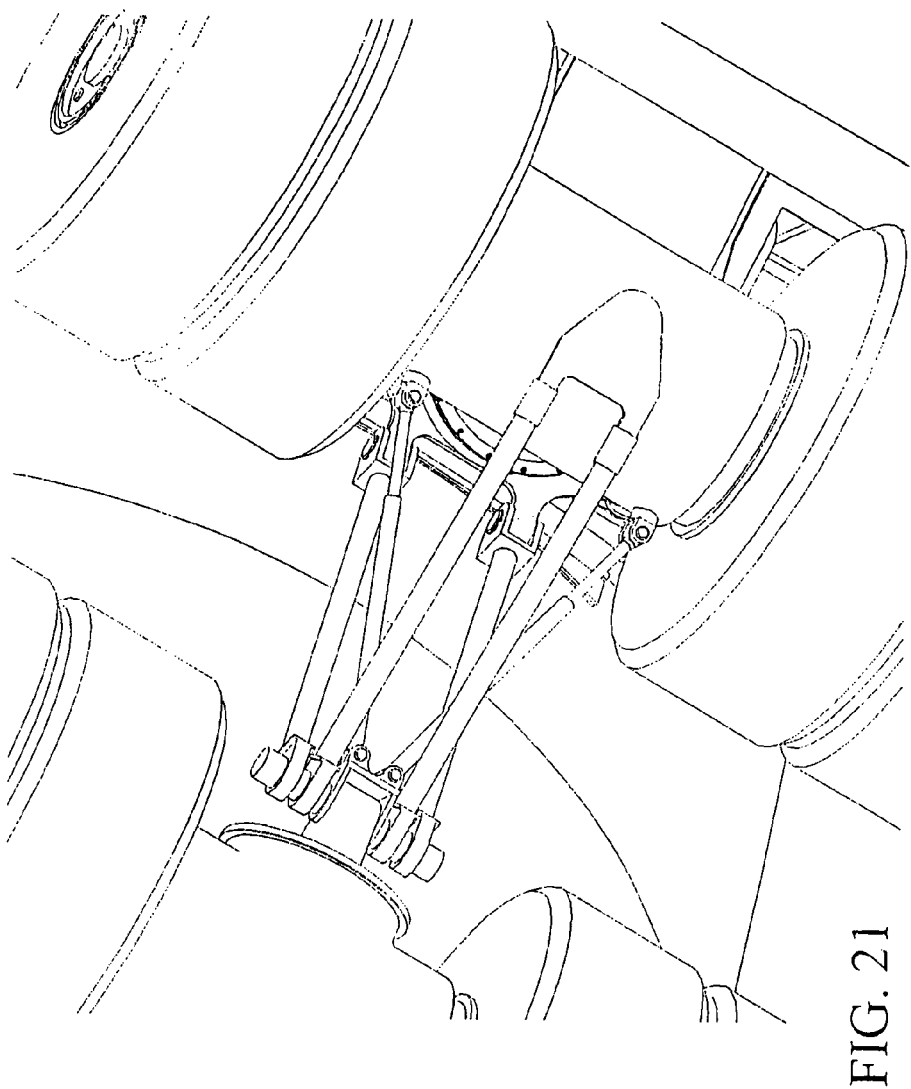
FIG. 21 is a perspective view from a lower angle of a preferred embodiment of the mining truck with three rigid axles of the present invention, showing in an assembled view the parts compounding the elements that make up the knuckle joined lightweight power and traction system, the steering system and the suspension system, at the rear portion of the mining truck.
Figure 22:
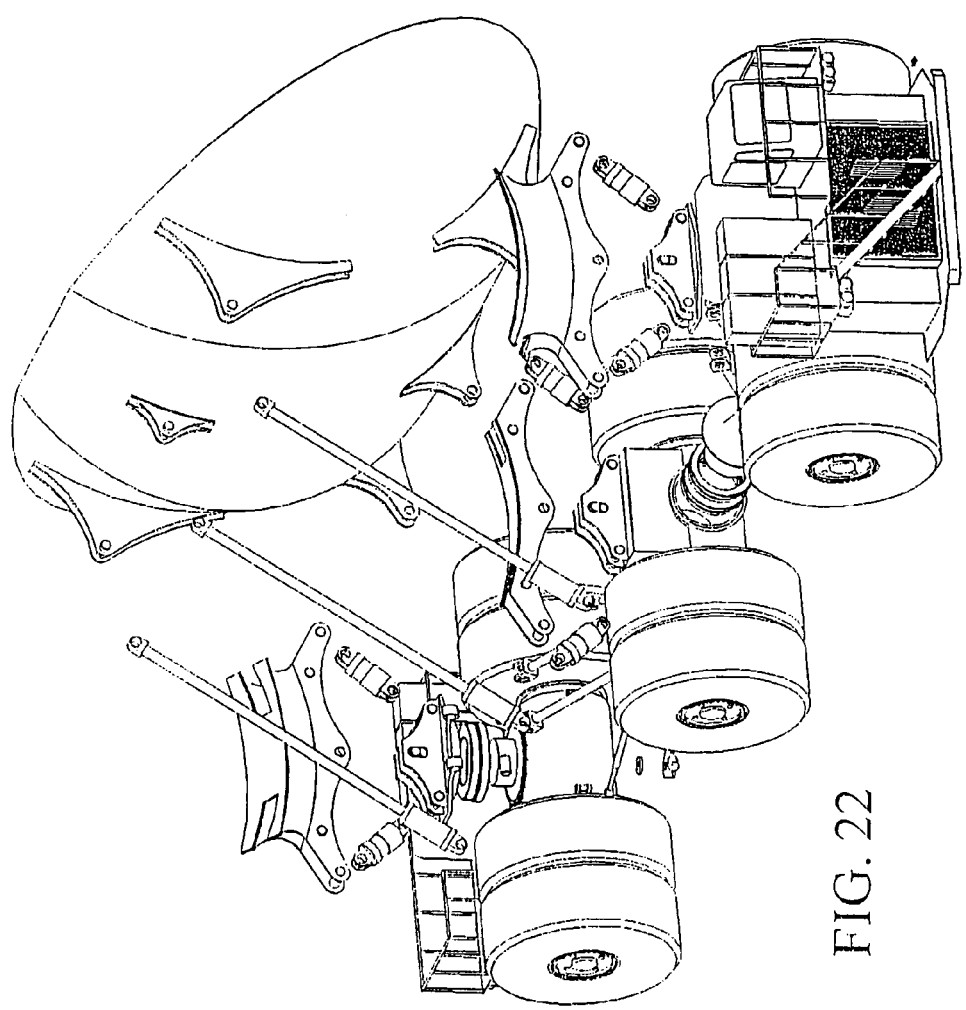
FIG. 22 is a perspective view from a front angle of a preferred embodiment of the mining truck with three rigid axles of the present invention, showing in exploded view of the parts compounding the elements that make up the knuckle joined lightweight power and traction system, the steering system and the suspension system, and the dump body in the mining truck.
Figure 23:
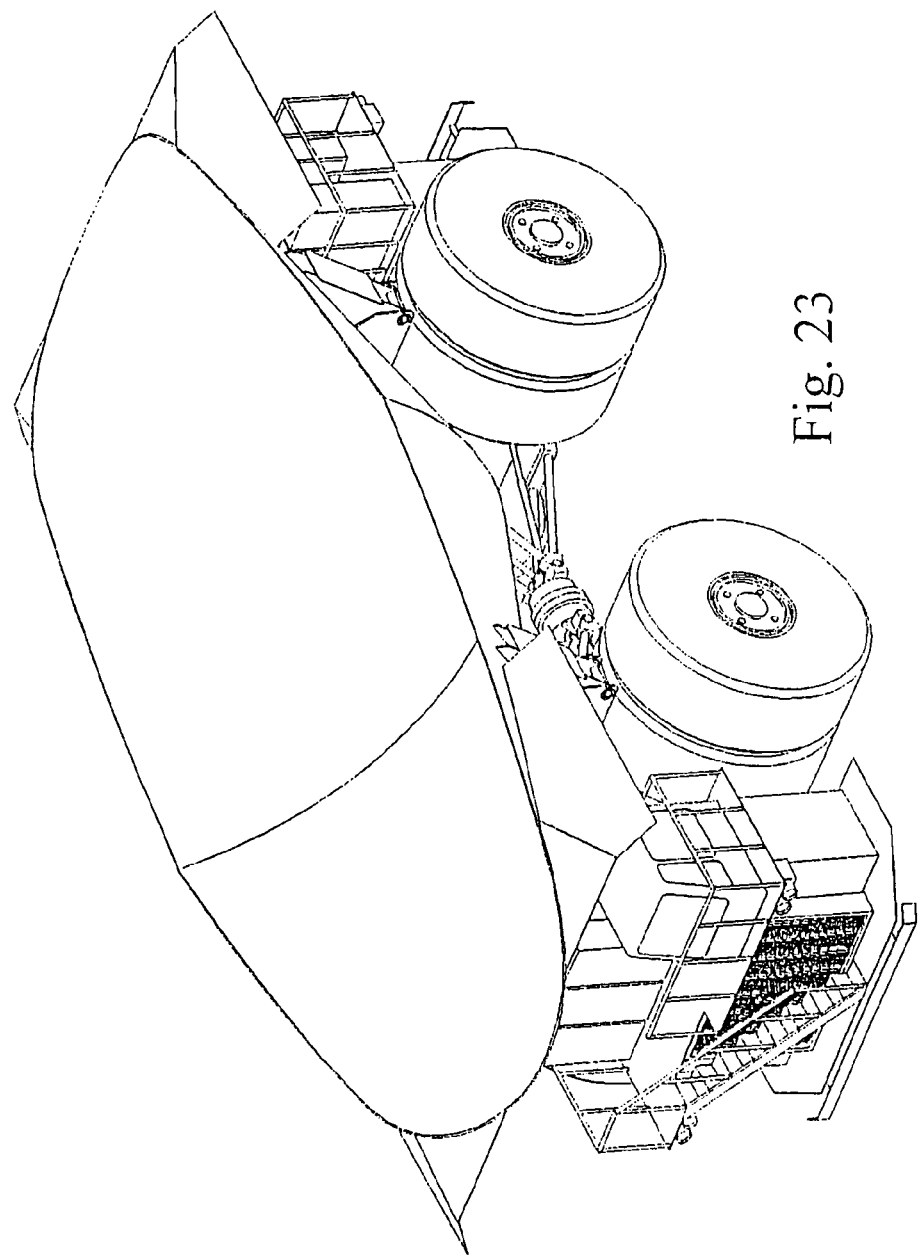
FIG. 23 is a perspective view from an upper angle of a preferred embodiment of the mining truck with two rigid axles of the present invention that shows its left front portion.
Figure 24:
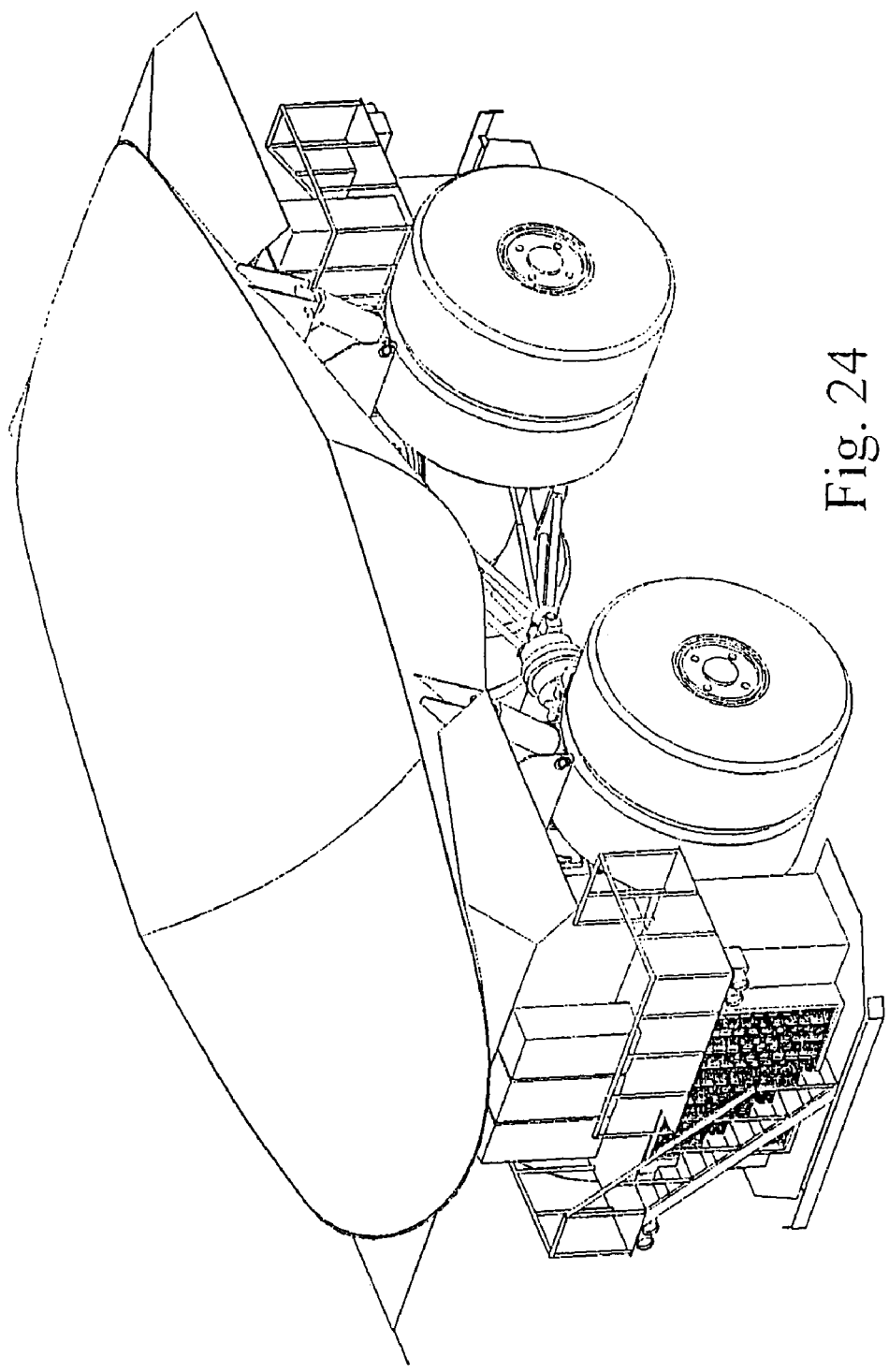
FIG. 24 is a perspective view from an upper angle of a preferred embodiment of she mining truck with two rigid axles of the present invention that shows its right rear portion.
Figure 25:
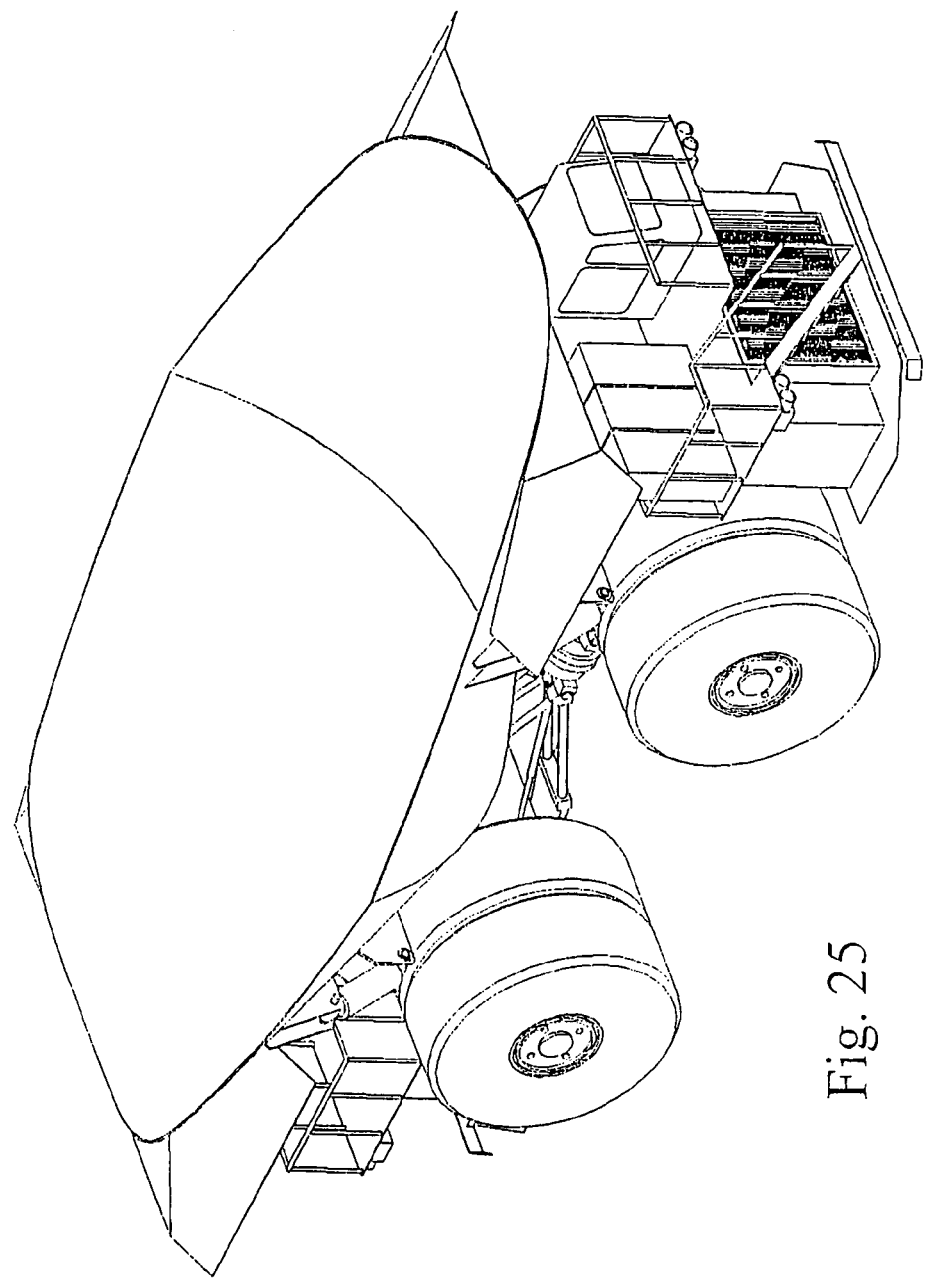
FIG. 25 is a perspective view from an upper angle of a preferred embodiment of the mining truck with two rigid axles of the present invention that shows its right front portion.
Figure 26:
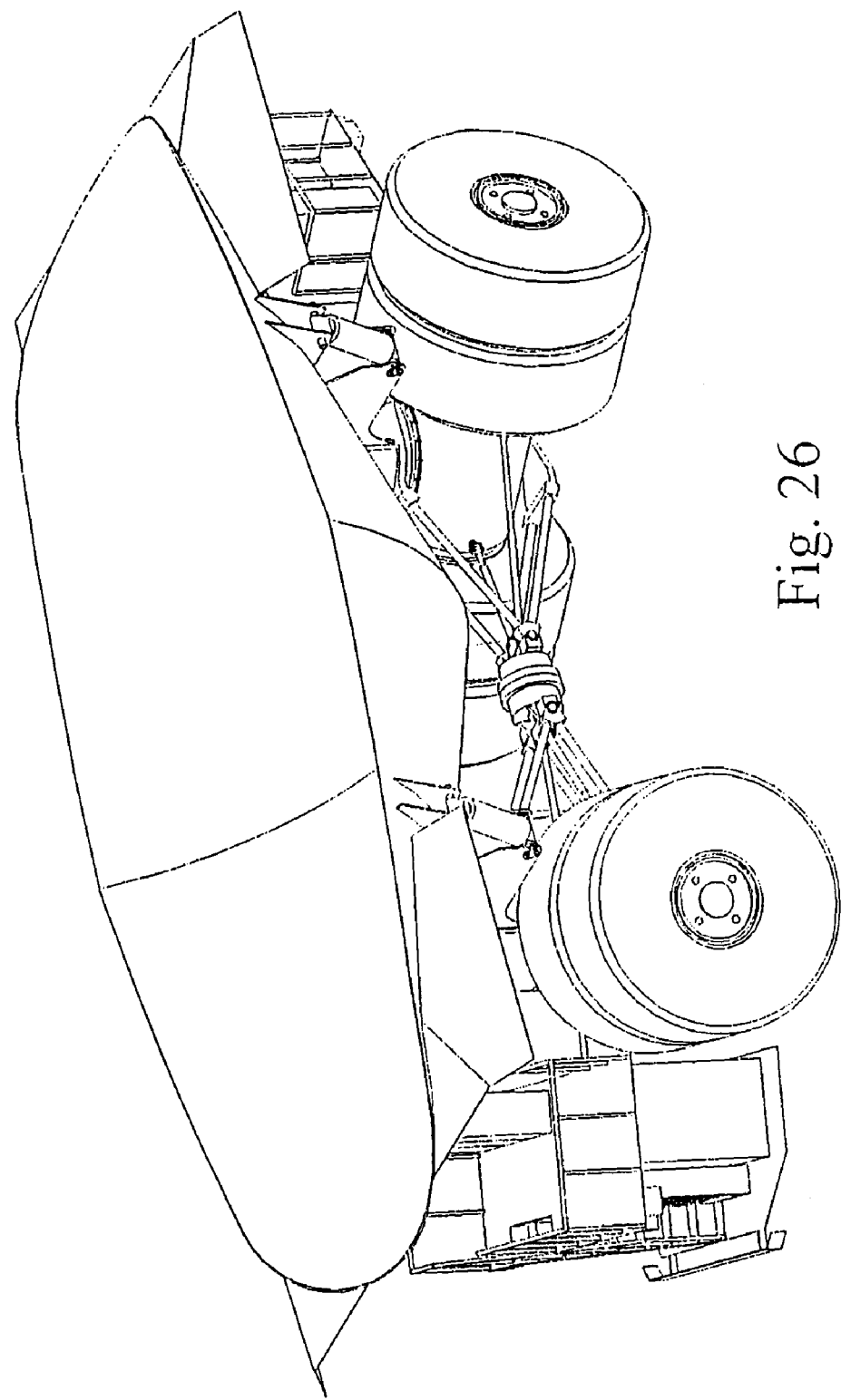
FIG. 26 is a perspective view from an upper angle of a preferred embodiment of the mining truck with two rigid axles of the present invention that shows its right rear portion, turning to the left.
Figure 27:
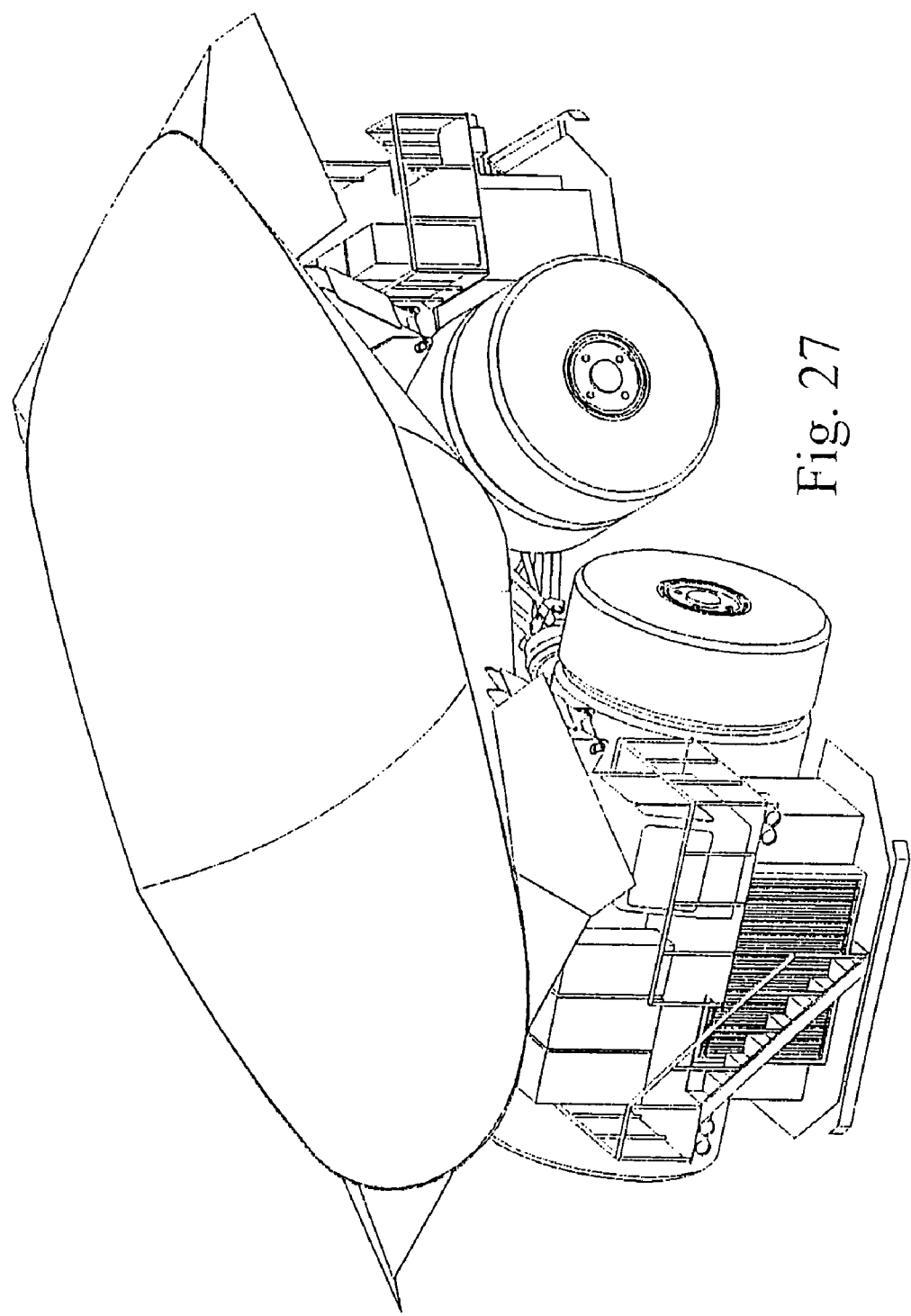
FIG. 27 is a perspective view from an upper angle of a preferred embodiment of the mining truck with two rigid axles of the present invention that shows its left front portion, turning to the left.
Figure 28:
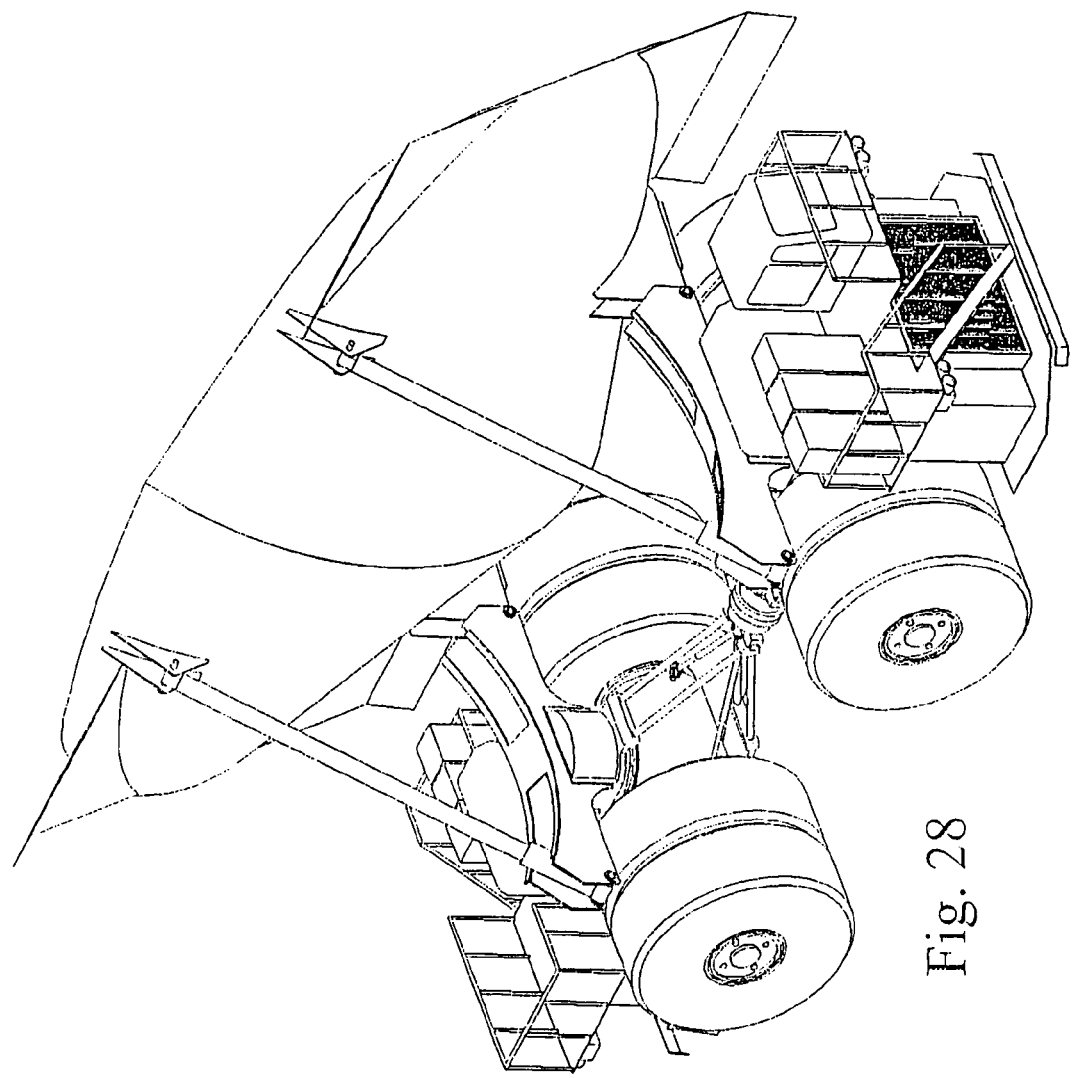
FIG. 28 is a perspective view from an upper angle of a preferred embodiment of the mining truck with two rigid axles of the present invention that shows its right front portion, dumping its load.
Figure 29:
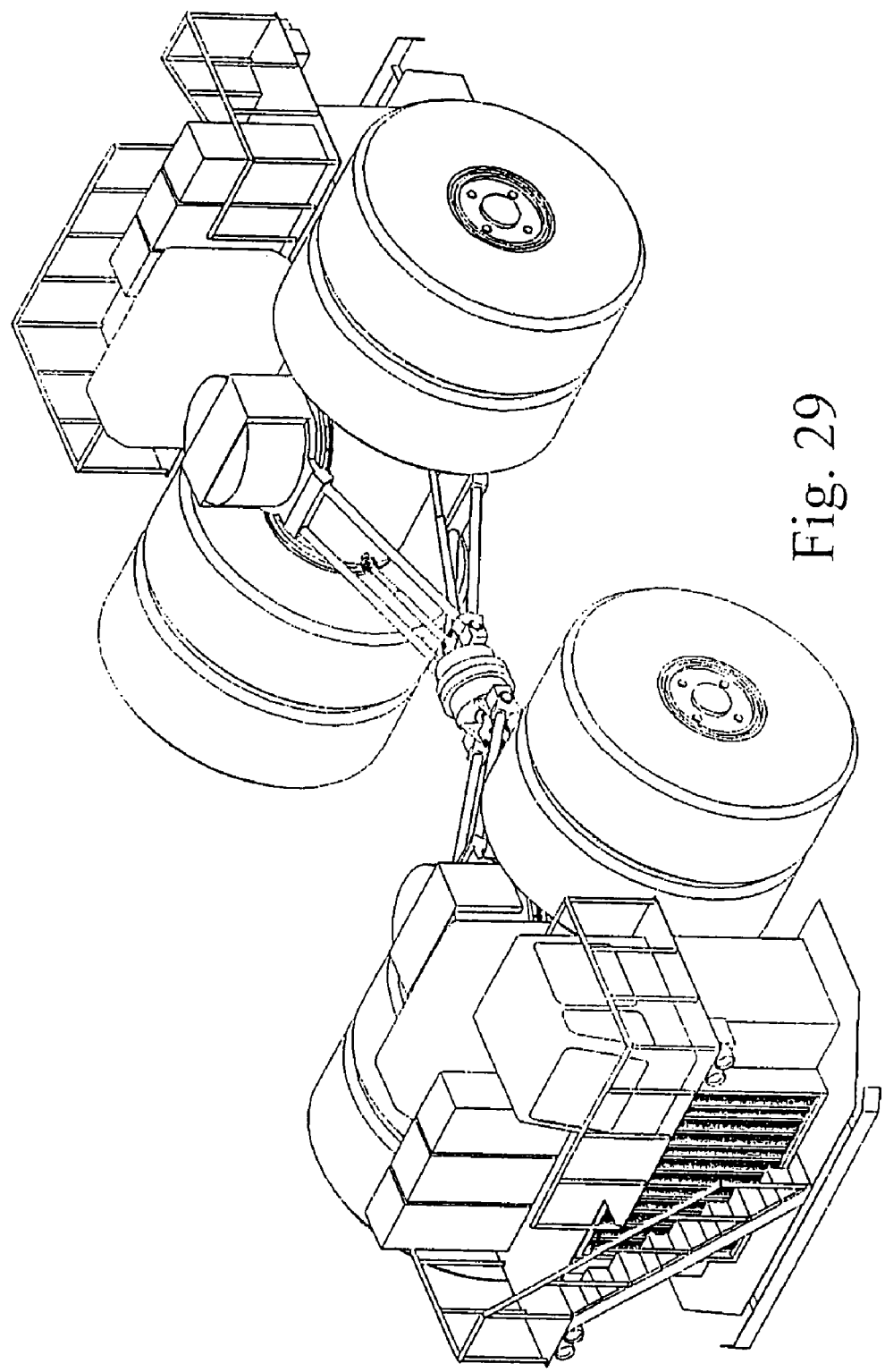
FIG. 29 is a perspective view from an upper angle of a preferred embodiment of the mining truck with two rigid axles of the present invention without the lightweight curved dump and showing the axle connecting structure knuckle joints.
Figure 30:
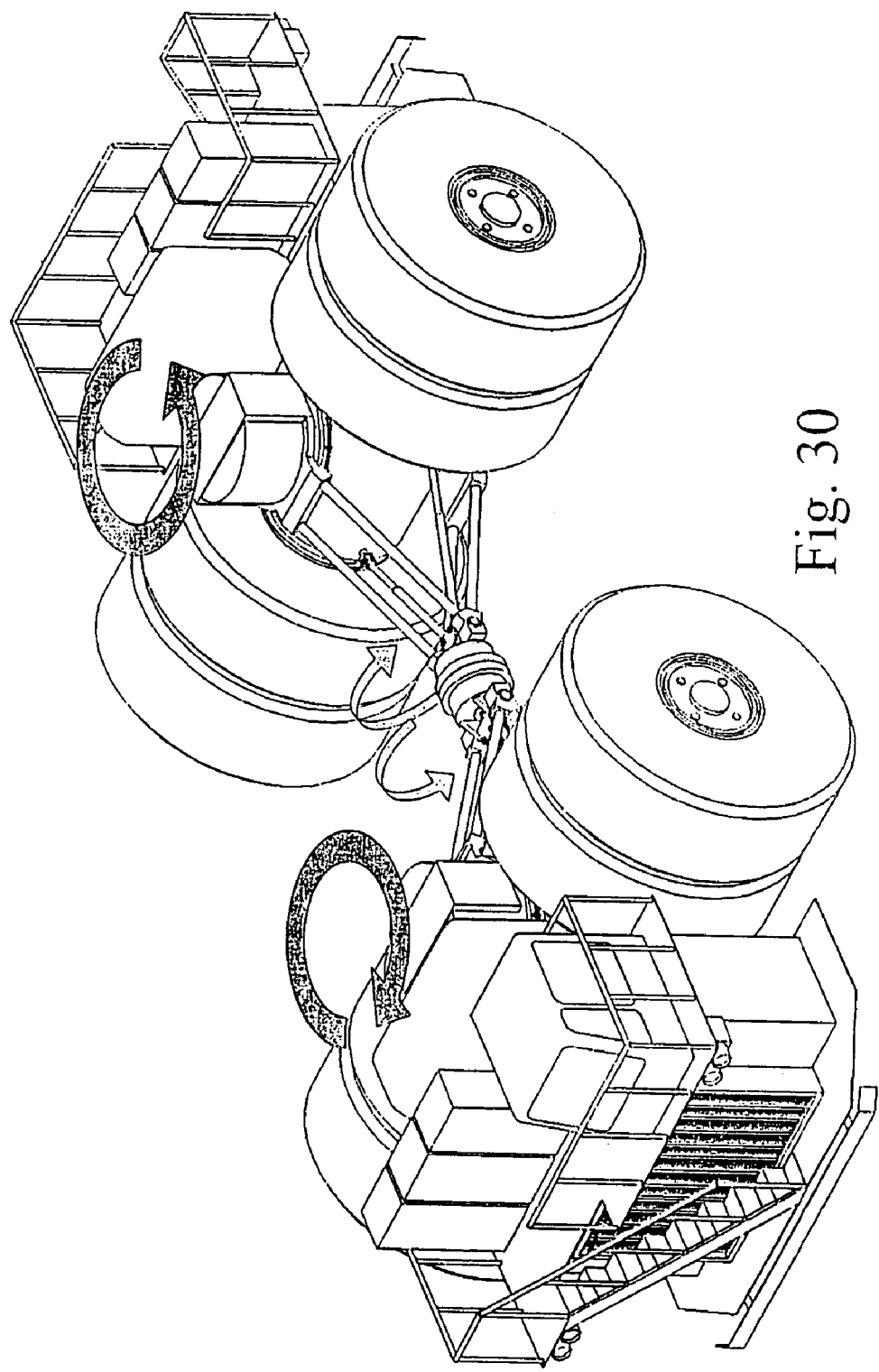
FIG. 30 is a perspective view from an upper angle of a preferred embodiment of the mining truck with two rigid axles of the present invention without the lightweight curved dump and showing knuckle joint rotation in the axle connecting structure.
Figure 31A:
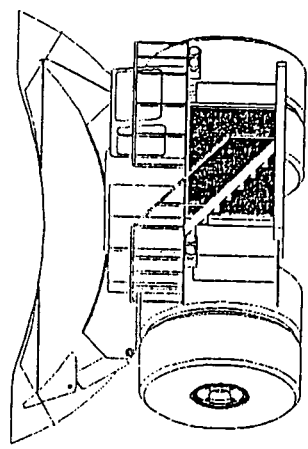
FIG. 31A is a front view of a preferred embodiment of the mining truck with two rigid axles of the present invention.
Figure 31B:
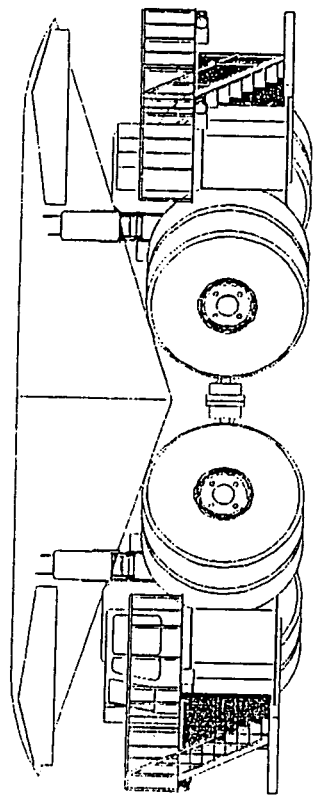
FIG. 31B is a side view of a preferred embodiment of the mining truck with two rigid axles of the present invention.
Figure 31C:
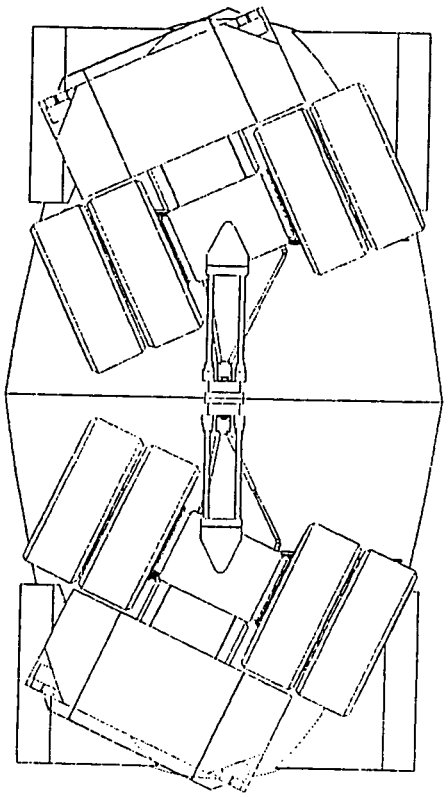
FIG. 31C is a bottom view of a preferred embodiment of the mining truck with two rigid axles of the present invention.
Figure 32B:
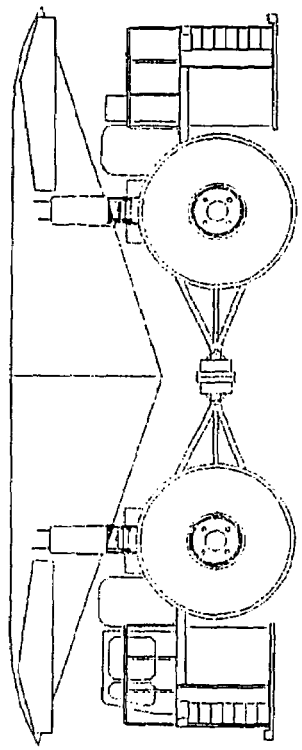
FIG. 32B is a side view of a preferred embodiment of the mining truck with two rigid axles of the present invention, turning to the left.
Figure 32C:
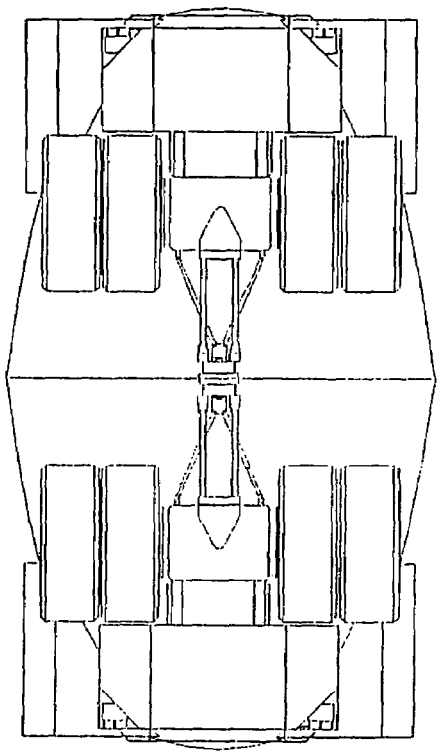
FIG. 32C is a bottom view of a preferred embodiment of the mining truck with two rigid axles of the present invention, turning to the left.
Figure 32A:
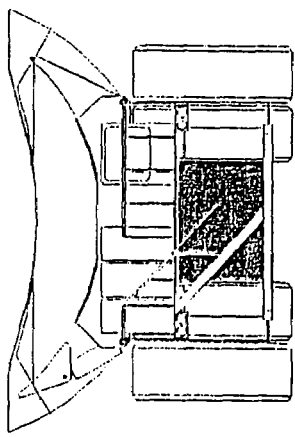
FIG. 32A is a front view of a preferred embodiment of the mining truck with two rigid axles of the present invention, turning to the left.
Figure 34B:
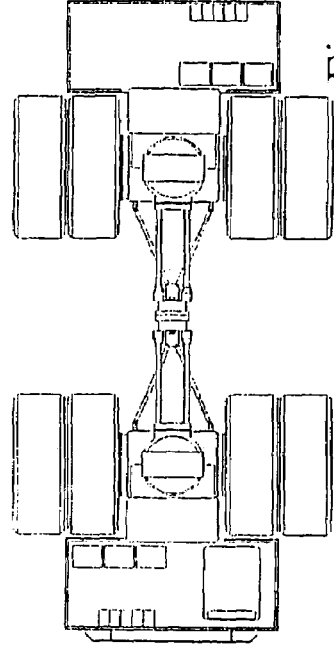
FIG. 34B is an upper view of a preferred embodiment of the mining truck with two rigid axles of the present invention, without the lightweight curved dump.
Figure 34C:
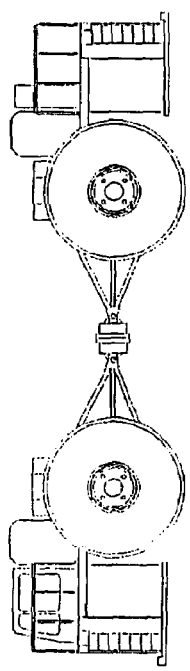
FIG. 34C is a side view of a preferred embodiment of the mining truck with two rigid axles of the present invention.
Figure 34D:
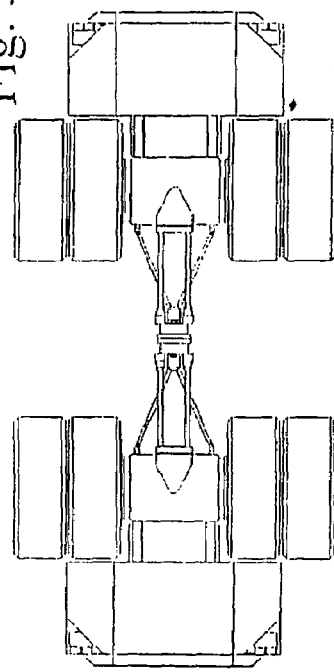
FIG. 34D is a bottom view of a preferred embodiment of the mining truck with two rigid axles of the present invention.
Figure 34A:
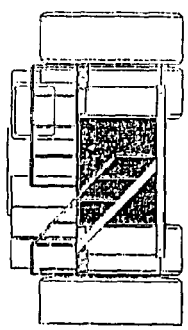
FIG. 34A is a front view of a preferred embodiment of the mining truck with two rigid axles of the present invention, without the lightweight curved dump.
Figure 35:
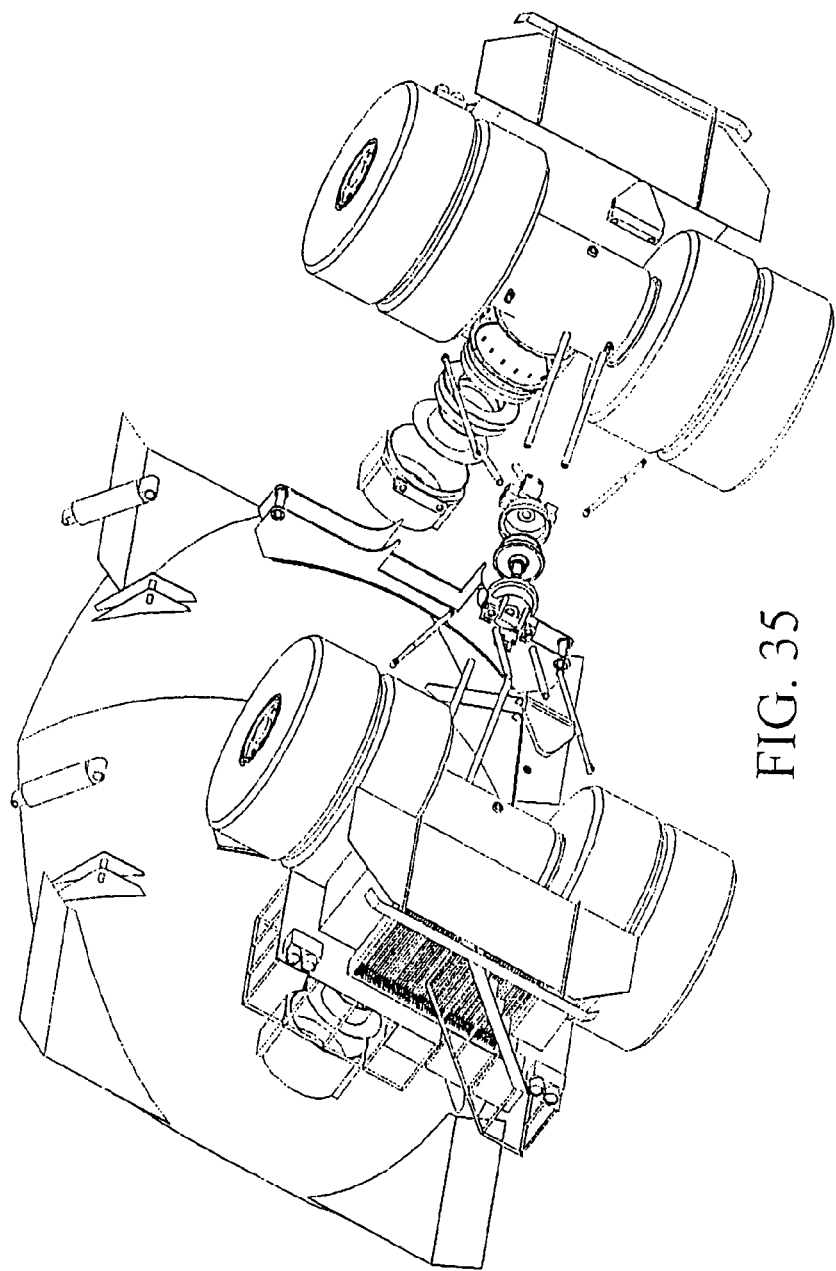
FIG. 35 is a perspective view from a lower angle of a preferred embodiment of the mining truck with two rigid axles of the present invention, showing in exploded view the elements that make up the knuckle joined lightweight power and traction system, the steering system and the suspension system.
Figure 36:
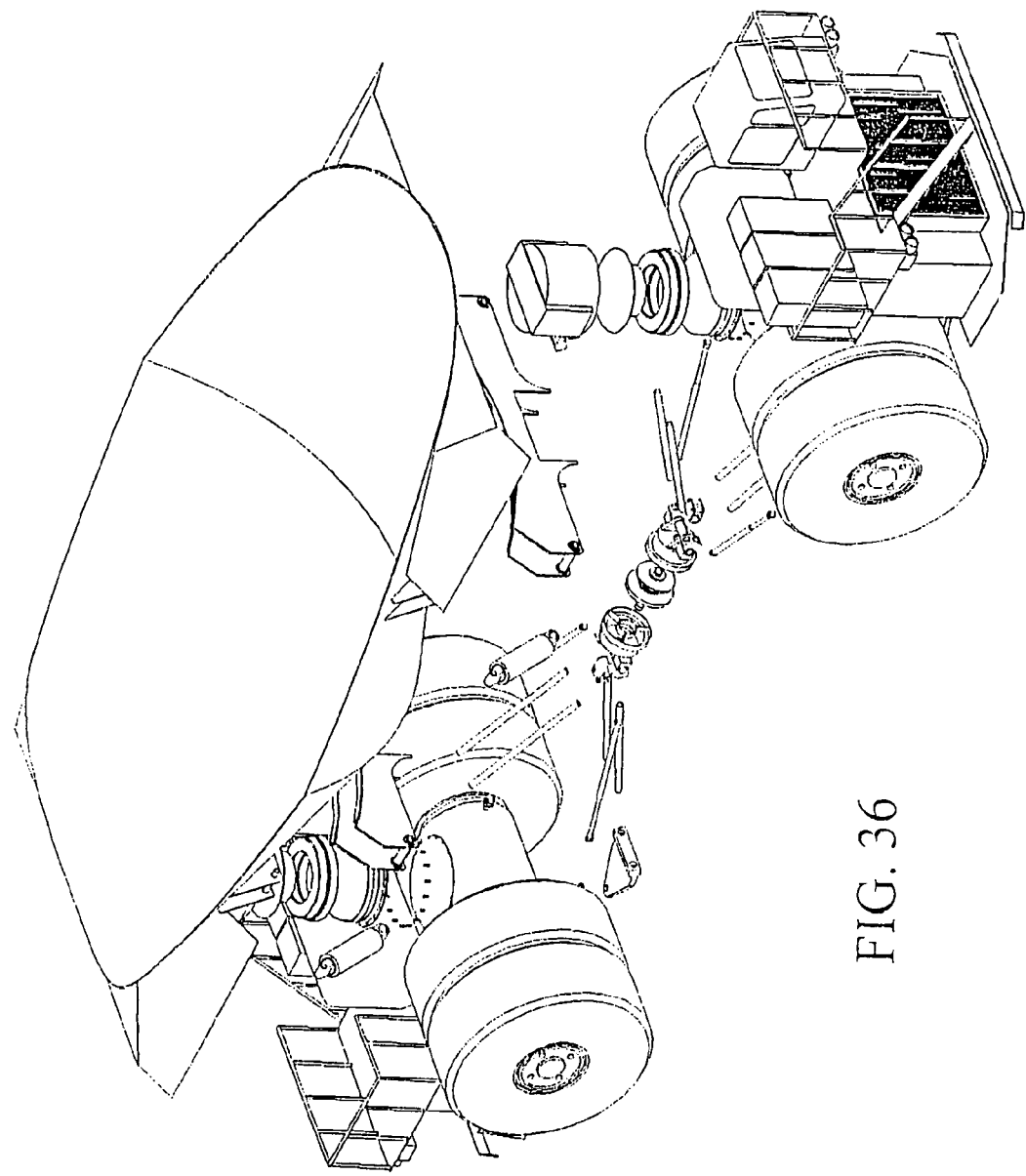
FIG. 36 is a perspective view from an upper angle of a preferred embodiment of the mining truck with two rigid axles of the present invention, showing in exploded view the elements that make up the knuckle joined lightweight power and traction system, the steering system and the suspension system.
Figure 37:
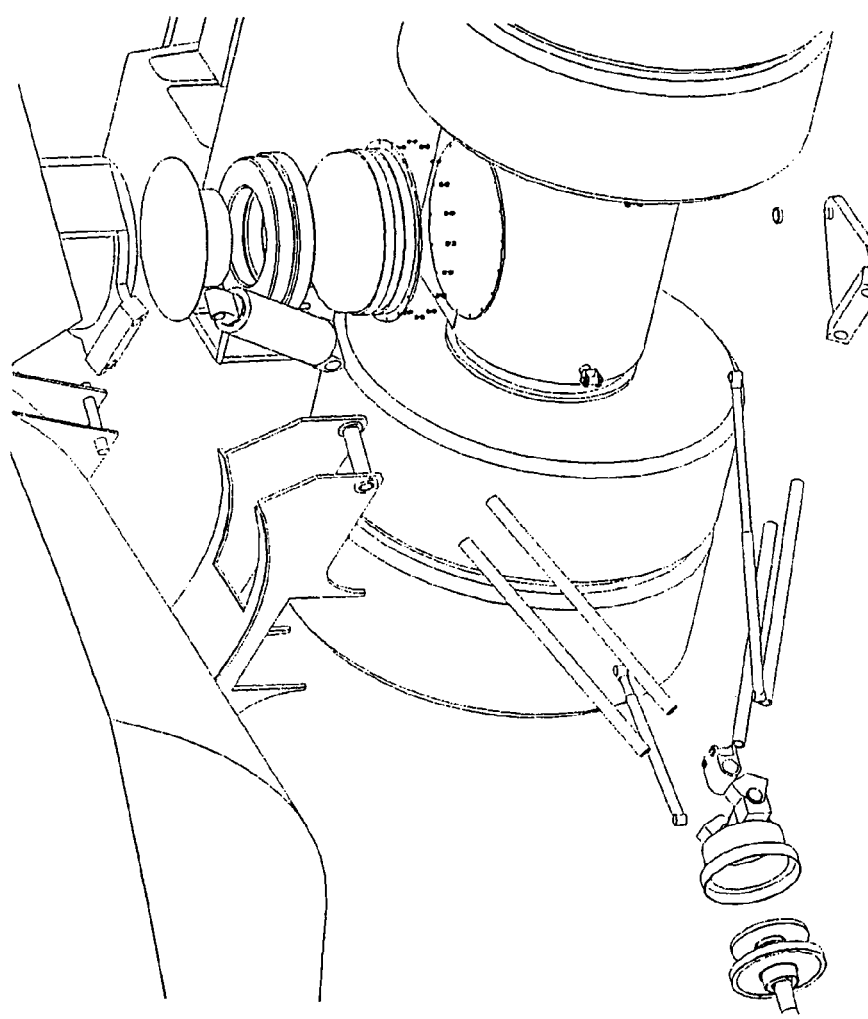
FIG. 37 is a perspective view from an upper angle of a preferred embodiment of the mining truck with two rigid axles of the present invention, showing in exploded view the elements that make up the knuckle joined lightweight power and traction system, the steering system and the suspension system, at the rear portion of the mining truck
Figure 38:
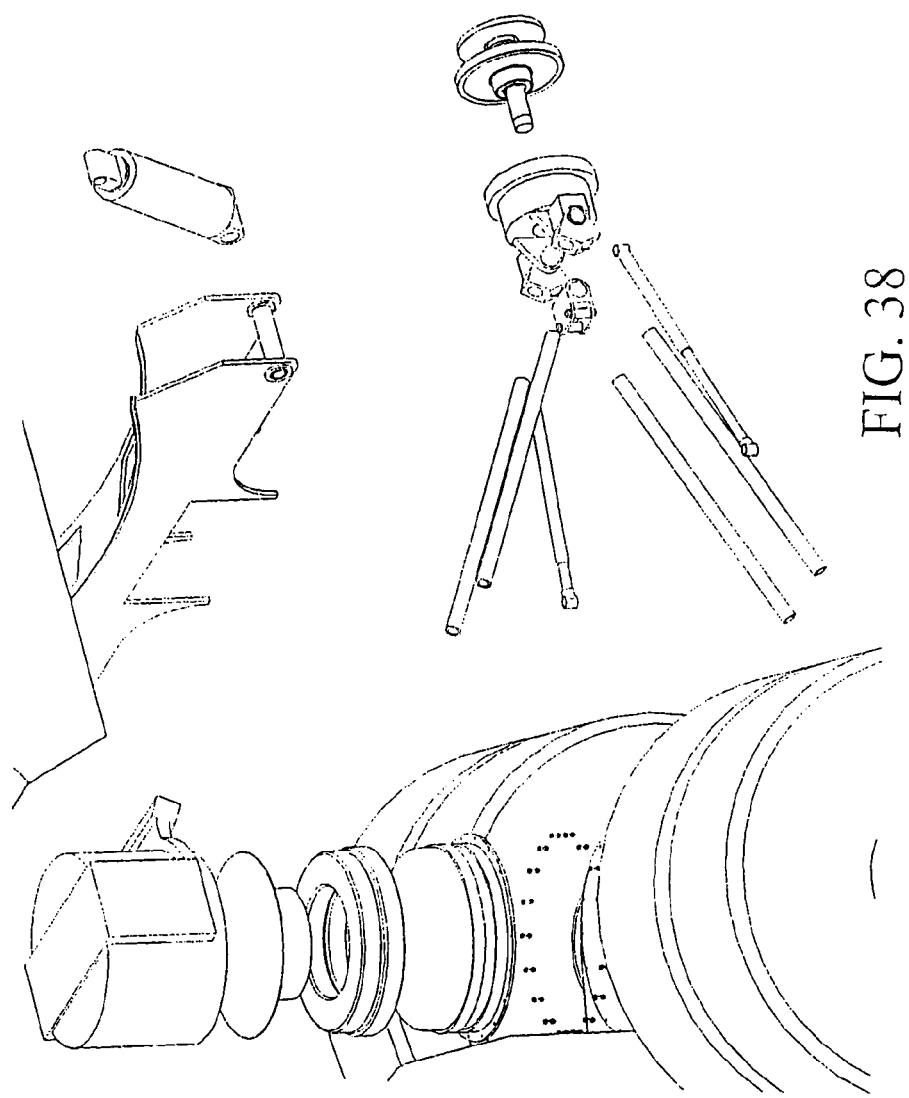
FIG. 38 is a perspective view from an upper angle of a preferred embodiment of the mining truck with two rigid axles of the present invention, showing in exploded view the elements that make up the knuckle joined lightweight power and traction system, the steering system and the suspension system, at the front portion of the mining truck.
Figure 39:
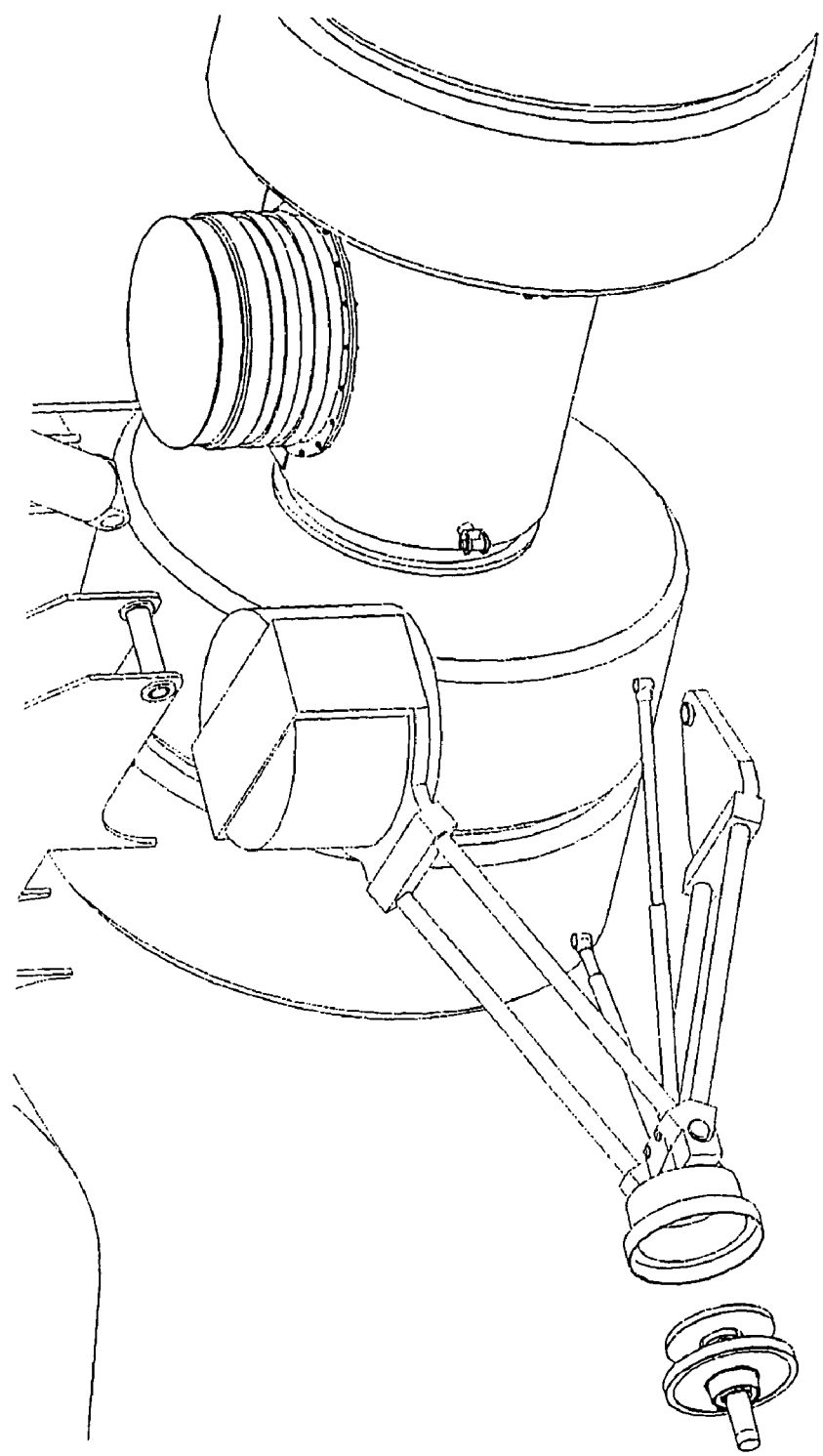
FIG. 39 is a perspective view from an upper angle of a preferred embodiment of the mining truck with two rigid axles of the present invention, showing in a semi-exploded view the elements that make up the knuckle joined lightweight power and traction system, the steering system and the suspension system, at the rear portion of the mining truck.
Figure 40:
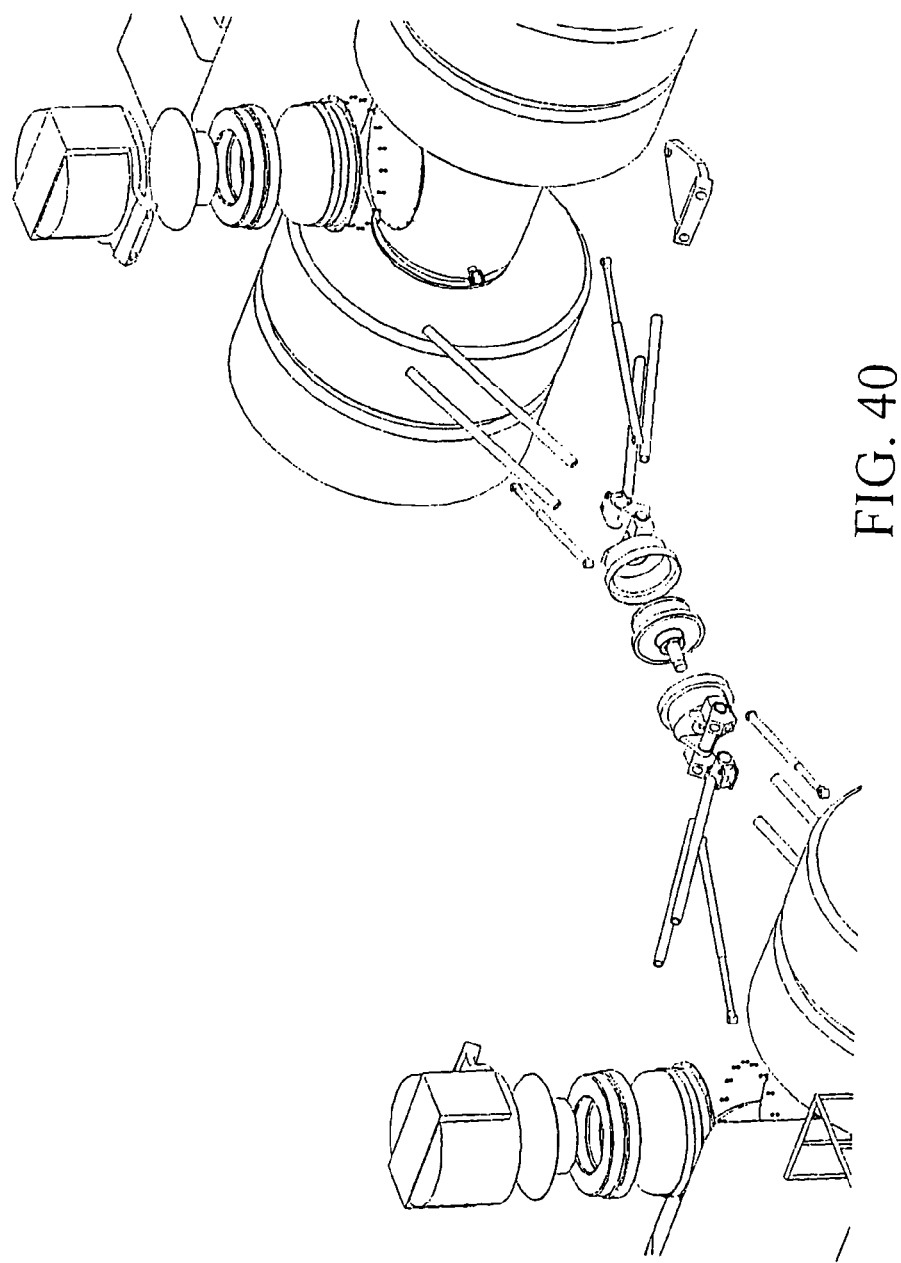
FIG. 40 is a perspective view from an upper angle of a preferred embodiment of the mining truck with two rigid axles of the present invention, showing in exploded view the elements that make up the knuckle joined lightweight power and traction system, the steering system and the suspension system, at the middle portion of the mining truck.
Figure 41:
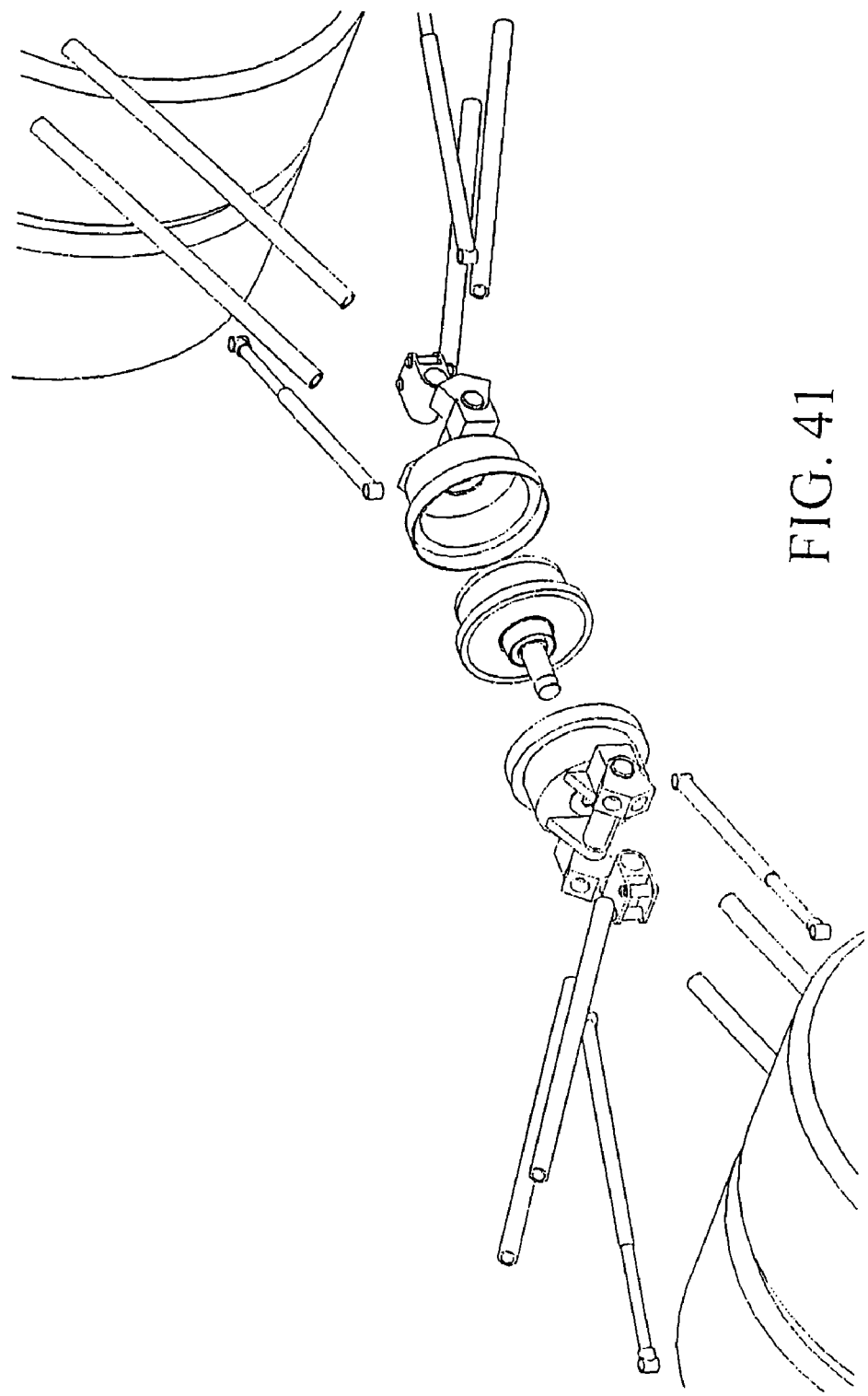
FIG. 41 is a perspective view from a lower angle of a preferred embodiment of the mining truck with two rigid axles of the present invention, showing in exploded view the elements that make up the knuckle joined lightweight power and traction system, the steering system and the suspension system, at the middle portion of the mining truck.
Figure 42:
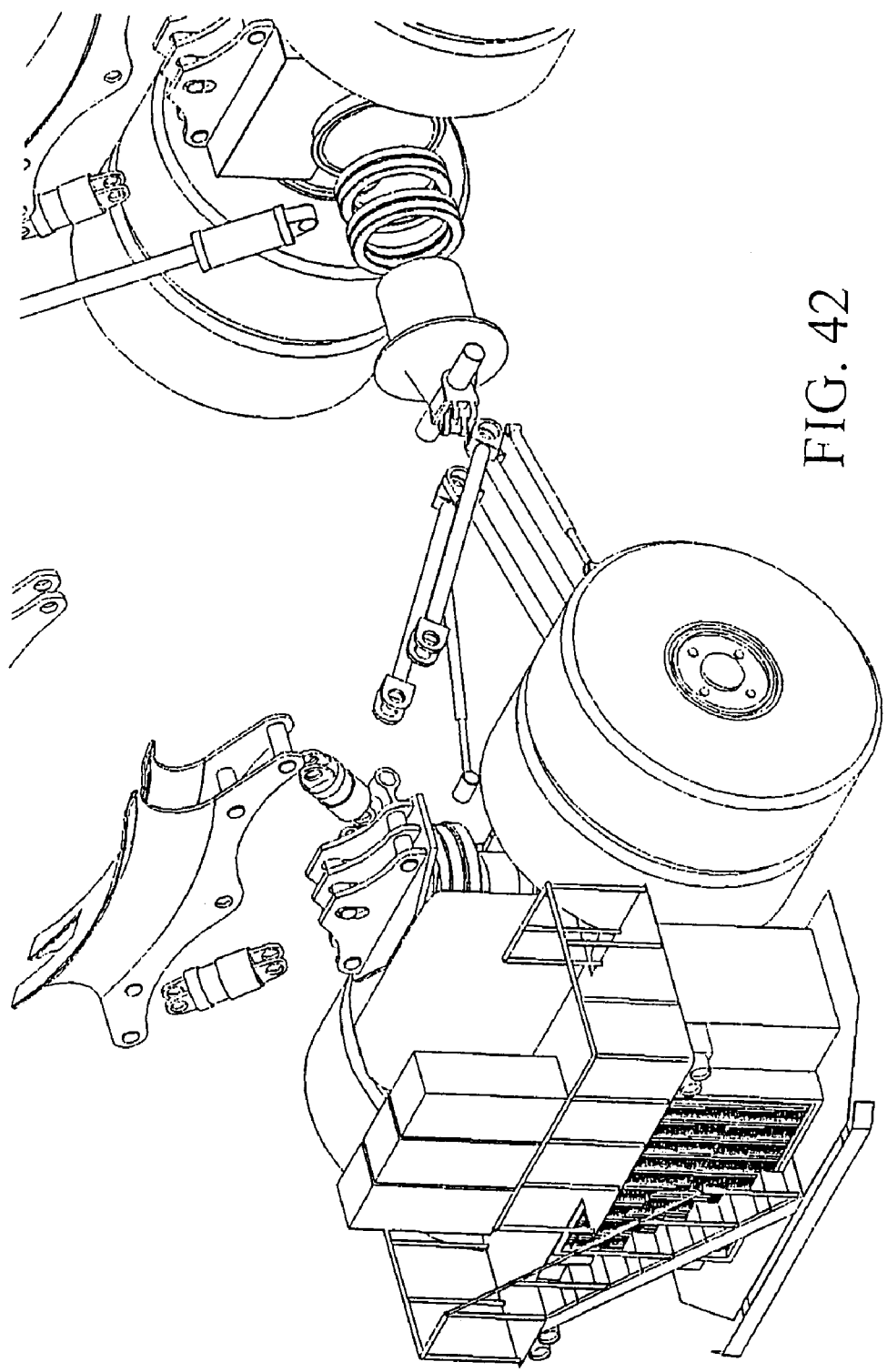
FIG. 42 is a perspective view from a side angle of a preferred embodiment of the mining truck with two rigid axles of the present invention, showing in exploded view the parts comprising the elements that make up the knuckle joined lightweight power and traction system, the steering system and the suspension system, at the rear portion of the mining truck.

The present invention refers to a more efficient high tonnage, ultra light mining truck for off-road applications that, in addition to a body, comprises a lightweight curved dump body and a knuckle joined lightweight power and traction system comprising two or three rigid axles.

In a preferred embodiment, the lightweight power and traction system comprises three rigid axles, wherein the central axle is fixed and the two end axles are rotary with respect to vertical shafts that pass through the center of the front and rear axles, forming the truck steering system.

In addition, in said preferred embodiment the fixed central axle is connected to the end axles by two lightweight symmetrical structures knuckle joined to both sides of the central axle that prevent bending moments and torques and, therefore, eliminate the requirement of a chassis.

With this knuckle joined lightweight power and traction system it is possible to assemble a vehicle for all kinds of applications using the same components of vehicles in the prior art, such as diesel motors, electric motors or hydraulic motors on wheels, tires and hydraulic systems that are being used to the present moment, but the vehicle that incorporates said system exhibits a greater payload capacity than vehicles that use traditional systems of the prior art. For example, in freight vehicles for mining applications that incorporate this system with three rigid axles, payload capacity will at least be trebled. Thus, in the case of freight vehicles for mining applications, transportation costs per hauled ton are reduced in about 40%.

Moreover, another characteristic of the vehicle equipped with a system that employs three rigid axles is that it makes possible to drive each pair of tires on each axle with motors selected from those of the electric, hydraulic or mechanic type, this being expressed in an increase in the power transmitted to the ground through 12 tires (6 pairs of tires). In the case of electric motors, both climbing speed and transport efficiency of the truck are advantageously improved.

Furthermore, with the incorporation of the present lightweight power system, the steering system of the rigid axles at the ends allows to reduce the truck turning radius, considerably increasing its maneuverability and, although it is provided of three rigid axles, there is no lateral gliding of the tires on the rear axles of the vehicle when taking curves due to their geometric configuration, which permits a safe and precise steering of said vehicles, specially in high tonnage freight trucks.

In another embodiment, the lightweight power and traction system comprises two rigid axles that are rotary with respect to vertical shafts that pass through the center of the front and rear axles, forming the steering system of the truck. Moreover, in said embodiment a lightweight symmetrical structure knuckle joined in the center, which prevents torques, connects the two rigid axles eliminating the requirement of a chassis.

The system with two rigid axles permits to assemble a truck making use of the same components, such as diesel motors, electric motors on wheels, tires and hydraulic systems, that have been used in the prior art in applications of all kinds, but with a payload capacity about twice the capacity of vehicles for mining applications of the prior art, reducing the cost per total hauled load in about 30% in the case of mining applications.

Moreover, and as an additional characteristic, due to the provision of two rigid axles, the present truck optionally allows to drive every wheel with motors selected from those of the electric, hydraulic or mechanic type, which in the case of electric motors is expressed in an increase of the power transmitted to the ground through 8 tires, allowing to increase the truck climbing speed and transport efficiency.

Besides, the vehicle steering system permits to reduce the turning radius considerably improving its maneuverability, particularly for underground mining applications as both axles are rotary.

The present invention refers to trucks that may be employed in all kinds of mining applications, preferably in large mining operations, and specifically for the transport of both barren material and ore.

The present lightweight power and traction system permits to assemble a freight truck of up to 1000-ton capacity, using the same tires and the same power systems of the prior art but in a different arrangement or assembly, thereby permitting a reduction in transport costs of more than 30%.

The present lightweight power and traction system that comprises three rigid axles contributes two great benefits to the prior art.

The first benefit is that the truck where it is incorporated is extremely light in comparison with those of the prior art, allowing to transport a much bigger load using the same power. As an example, if required to transport a 1000-ton load, it is necessary to use three traditional trucks of the prior art, each of a 340-ton capacity with an empty weight of about 200 tons, so that in order to move a 1000-ton load, 600 tons of truck weight must be moved, implying a total gross weight of 1600 tons.

In addition, the lightweight power and traction system disclosed in this application permits to assemble a 1000-ton capacity mining truck with an empty weight of about 250 tons, so that in order to move a 1000-ton load it is necessary to move a total gross weight of only 1250 tons.

The second benefit is that the mining truck may be equipped with 12 tires and two diesel-electric power modules, allowing to treble its payload capacity with respect to the prior art and using only ⅔ of the power, ⅔ of the tires and ⅓ of the operators, with a cost reduction per moved ton of more than 30%.

In turn, the lightweight power and traction system that comprises two rigid axles permits to assemble a mining truck of up to 600-ton capacity using the same tires and the same power systems as in the prior art, but in a different arrangement or assembly that allows a reduction of transport costs of about 30%.

This lightweight power and traction system that comprises two rigid axles contributes two great benefits to the prior art.

The first is that this truck is extremely light in comparison with those of the prior art, allowing it to carry a much bigger load with the same power. For example, if required to transport a 600-ton load, it is necessary to use two trucks of the prior art, each with an empty weight of about 200 tons; therefore, in order to move a 600-ton load it is necessary to move 400 tons of truck weight, which implies a total gross weight of 1000 tons.

This new concept permits to assemble a 600-ton capacity truck with an empty weight of approximately 200 tons, so that in order to move a 600-ton load it is necessary to move a total gross weight of only 800 tons.

The second is that that this truck may be equipped with 8 tires and two diesel-electric power modules, permitting to double its payload capacity with respect to the prior art with only 80% of the power, ⅔ of the tires and ⅔ of the operators, with a significant reduction of transport costs.

It is evident to an expert in the art that the above described mining truck may be modified to include other power means, other types of motors or traction means, or it may additionally incorporate a series of reinforcements that allow the system to resist or support the load to which it will be subjected, load that is variable and depends on the application of the vehicle that comprises the present system. For this reason, every modification in this sense, or similar is within the scope of the present invention.

The invention claimed is:

1. A high tonnage, ultra light mining truck with a greater load efficiency for off-road applications that comprises a body, a knuckle joined lightweight power and traction system consisting of:

one central fixed rigid axle and two rotary rigid end axles, connected to each other by two lightweight symmetrical structures knuckle joined about a horizontal longitudinal shaft and to two horizontal perpendicular shafts located at each side of the fixed central axle in the truck, said rotary rigid end axles forming the truck's steering system; and a lightweight curved dump body.

2. The mining truck according to claim 1, wherein each of said lightweight symmetric structures comprises four tubular bars joined to the central axle by means of two pins that allow rotation and fasten the two structures to two rotary vertical plates located on each side of the central axle and to four rotary horizontal plates, one of these on top of a front axle central portion, and another at the bottom of the front axle central portion, and one of these on top of a rear axle central portion and another at the bottom of the rear axle central portion; the lightweight symmetric structure further comprising four hydraulic cylinders, two that rotate the front axle and two that rotate the rear axle at equal but opposite angles.

3. The mining truck according to claim 1, further comprising one or more diesel-electric power modules, at a front end, at a rear end or at both the front and rear ends.

4. The mining truck according to claim 1, further comprising one or more diesel-hydraulic power modules, at a front end, at a rear end or at both the front and rear ends.

5. The mining truck according to claim 1, further comprising one or more diesel-mechanic power modules, at a front end, at a rear end or at both the front and rear ends.

6. The mining truck according to claim 2, further comprising one or more diesel-electric power modules, at a front end, at a rear end or at both the front and rear ends.

7. The mining truck according to claim 2, further comprising one or more diesel-hydraulic power modules, at a rear end or at both a front and the rear end.

8. The mining truck according to claim 2, further comprising one or more diesel-mechanic power modules, at a rear end or at both a front and the rear end.

9. The mining truck according to claim 1, wherein the lightweight curved dump body has three cylindrical steel sections joined at an angle to form a container.

10. The mining truck according to claim 1, wherein the lightweight curved dump body further comprises a three-cylinder suspension system mounted on the three rigid axles by means of a central sliding pin and two pneumatic-hydraulic cylinders or helical springs at ends thereof.

11. The mining truck according to claim 1, further comprising a side ripping system for the lightweight curved dump body with three lateral raising cylinders consisting of three pistons and three supporting elements in an opposite face.

12. The mining truck according to any of claims 1-3 or 6, further comprising at least one electric motor on at least one axle.

13. The mining truck according to any of claims 1, 2, 4 or 7, further comprising at least one hydraulic motor on at least one axle.

14. The mining track according to any of claims 1, 2, 5 or 8, further comprising at least one mechanic motor on at least one axle.

* * * * *